United States Patent
Kim et al.

(10) Patent No.: US 11,349,611 B2
(45) Date of Patent: May 31, 2022

(54) METHOD FOR TRANSMITTING OR RECEIVING FRAME IN WIRELESS LAN AND DEVICE THEREFOR

(71) Applicant: LG ELECTRONICS INC., Seoul (KR)

(72) Inventors: Jeongki Kim, Seoul (KR); Kiseon Ryu, Seoul (KR); Jinyoung Chun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 16/956,490

(22) PCT Filed: Dec. 4, 2018

(86) PCT No.: PCT/KR2018/015229
§ 371 (c)(1),
(2) Date: Jun. 19, 2020

(87) PCT Pub. No.: WO2019/124822
PCT Pub. Date: Jun. 27, 2019

(65) Prior Publication Data
US 2021/0099253 A1    Apr. 1, 2021

Related U.S. Application Data

(60) Provisional application No. 62/607,326, filed on Dec. 19, 2017.

(30) Foreign Application Priority Data

Mar. 16, 2018  (KR) .................. 10-2018-0030957
Mar. 23, 2018  (KR) .................. 10-2018-0034148
Mar. 29, 2018  (KR) .................. 10-2018-0036858

(51) Int. Cl.
*H04L 1/18* (2006.01)
*H04B 7/0417* (2017.01)
*H04L 5/00* (2006.01)

(52) U.S. Cl.
CPC ......... *H04L 1/1812* (2013.01); *H04B 7/0417* (2013.01); *H04L 5/0055* (2013.01)

(58) Field of Classification Search
CPC ... H04L 1/1812; H04L 5/0055; H04L 1/1607; H04L 1/1861; H04B 7/0417; H04B 7/0697
See application file for complete search history.

(56) References Cited

U.S. PATENT DOCUMENTS

2008/0101285 A1*  5/2008  Venkatachalam ..... H04L 1/1607
                                                    370/329
2009/0323577 A1* 12/2009  Agrawal ............... H04L 1/0026
                                                    370/312

(Continued)

OTHER PUBLICATIONS

"Views on UL HARQ-ACK feedback design"; NTT DOCOMO; 3GPP TSG RAN WG1 Meeting #90 R1-1713887 Prague, Czechia, Aug. 21-25, 2017 (Year: 2017).*

(Continued)

*Primary Examiner* — Benjamin H Elliott, IV
(74) *Attorney, Agent, or Firm* — Lee, Hong, Degerman, Kang & Waimey PC

(57) ABSTRACT

A method by which a station (STA) transmits an HARQ feedback frame in a wireless LAN system for supporting an HARQ process, according to one embodiment of the present invention, comprises: receiving an HARQ PPDU including a plurality of HARQ bursts; determining an ACK/NACK for at least one HARQ burst allocated to the STA, among the plurality of HARQ bursts; and transmitting, on the basis of the ACK/NACK determination result, an HARQ feedback frame including a predetermined sequence.

15 Claims, 45 Drawing Sheets

(56) References Cited

U.S. PATENT DOCUMENTS

| | | | | |
|---|---|---|---|---|
| 2013/0064180 | A1* | 3/2013 | Bergman | H04L 1/1854 370/328 |
| 2015/0049708 | A1* | 2/2015 | Damnjanovic | H04L 1/1854 370/329 |
| 2016/0080115 | A1* | 3/2016 | Josiam | H04L 1/1854 370/329 |
| 2016/0135142 | A1* | 5/2016 | Lee | H04L 12/1877 370/329 |
| 2016/0323881 | A1* | 11/2016 | Bhora | H04L 5/0055 |
| 2017/0055281 | A1* | 2/2017 | Islam | H04W 72/1289 |
| 2017/0230149 | A1* | 8/2017 | Wang | H04L 1/1819 |
| 2018/0054282 | A1* | 2/2018 | Wang | H04L 5/0048 |
| 2018/0160400 | A1* | 6/2018 | Liu | H04W 72/042 |
| 2021/0099253 | A1* | 4/2021 | Kim | H04L 1/1812 |

OTHER PUBLICATIONS

PCT International Application No. PCT/KR2018/015229, Written Opinion of the International Searching Authority dated Apr. 4, 2019, 20 pages.

* cited by examiner (a)

(b)

(a)

(b)

(a)

(b)

(a)

(b)

METHOD FOR TRANSMITTING OR RECEIVING FRAME IN WIRELESS LAN AND DEVICE THEREFOR

CROSS-REFERENCE TO RELATED APPLICATIONS

This application is the National Stage filing under 35 U.S.C. 371 of International Application No. PCT/KR2018/015229, filed on Dec. 4, 2018, which claims the benefit of earlier filing date and right of priority to U.S. Provisional Application No. 62/607,326, filed on Dec. 19, 2017, and also claims the benefit of Korean Application Nos. 10-2018-0030957, filed on Mar. 16, 2018, 10-2018-0034148, filed on Mar. 23, 2018, and 10-2018-0036858, filed on Mar. 29, 2018, the contents of which are all incorporated by reference herein in their entireties.

TECHNICAL FIELD

The present disclosure relates to frame transmission and reception in a wireless local area network (WLAN), and more particularly, to a method and apparatus for transmitting and receiving a frame in a WLAN supporting a hybrid automatic repeat request (HARQ) process.

BACKGROUND ART

Standards for wireless local area network (WLAN) technology have been developed as institute of electrical and electronics engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying multiple input multiple output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

Provided are a method and apparatus for efficiently and accurately transmitting and receiving a hybrid automatic repeat request (HARQ) feedback frame including acknowledgment/negative acknowledgment (ACK/NACK) information for a received physical layer protocol data unit (PPDU) in a wireless local area network (WLAN) supporting an HARQ process.

The objects that could be achieved with the present disclosure are not limited to what has been particularly described hereinabove, and other objects that the present disclosure could achieve will be more clearly understood from the following detailed description.

Technical Solution

According to an aspect of the present disclosure, a method of transmitting a hybrid automatic repeat request (HARQ) feedback frame by a station (STA) in a wireless local area network (WLAN) system supporting an HARQ process includes receiving an HARQ physical layer protocol data unit (PPDU) including a plurality of HARQ bursts, determining an acknowledgment/negative acknowledgment (ACK/NACK) for at least one HARQ burst allocated to the STA among the plurality of HARQ bursts, and transmitting an HARQ feedback frame including a specific sequence based on a result of the ACK/NACK determination. A band in which the HARQ feedback frame is transmitted includes a plurality of tone sets, each tone set being divided into a first subset of tones and a second subset of tones. The STA transmits the specific sequence in a specific tone set related to the at least one HARQ burst. When the result of the ACK/NACK determination is the ACK, the STA transmits the specific sequence only in the first subset of tones of the specific tone set, and when the result of the ACK/NACK determination is the NACK, the STA transmits the specific sequence only in the second subset of tones of the specific tone set.

According to another aspect of the present disclosure, a method of receiving an HARQ feedback frame by an access point (AP) in a WLAN system supporting an HARQ process includes transmitting an HARQ PPDU including a plurality of HARQ bursts, receiving an HARQ feedback frame from an STA, and determining an ACK/NACK feedback of the STA for at least one HARQ burst allocated to the STA among the plurality of HARQ bursts, based on the HARQ feedback frame. A band in which the HARQ feedback frame is transmitted includes a plurality of tone sets, each tone set being divided into a first subset of tones and a second subset of tones. The AP receives a specific sequence in a specific tone set related to the at least one HARQ burst. When the AP receives the specific sequence only in the first subset of tones of the specific tone set, the AP determines that the ACK/NACK feedback of the STA is an ACK, and when the AP receives the specific sequence only in the second subset of tones of the specific tone set, the AP determines that the ACK/NACK feedback of the STA is a NACK.

According to another aspect of the present disclosure, an STA for transmitting an HARQ feedback frame in a WLAN system supporting an HARQ process includes a receiver, a transmitter, and a processor configured to receive an HARQ PPDU including a plurality of HARQ bursts through the receiver, determine an ACK/NACK for at least one HARQ burst allocated to the STA among the plurality of HARQ bursts, and transmit an HARQ feedback frame including a specific sequence based on a result of the ACK/NACK determination through the transmitter. A band in which the HARQ feedback frame is transmitted includes a plurality of tone sets, each tone set being divided into a first subset of tones and a second subset of tones. The processor is configured to transmit the specific sequence in a specific tone set related to the at least one HARQ burst. When the result of the ACK/NACK determination is the ACK, the processor is configured to transmit the specific sequence only in the first subset of tones of the specific tone set, and when the result of the ACK/NACK determination is the NACK, the processor is configured to transmit the specific sequence only in the second subset of tones of the specific tone set.

Each of the plurality of HARQ bursts may be related to one of the plurality of tone sets. For a result of ACK/NACK determination for an $N^{th}$ HARQ burst among the plurality of HARQ bursts, the STA may transmit the specific sequence in an $N^{th}$ tone set among the plurality of tone sets.

One tone set may be related to every set of k HARQ bursts among the plurality of HARQ bursts, and results of the ACK/NACK determination for k HARQ bursts may be multiplexed in a time domain or a spatial domain and mapped to one tone set.

The results of the ACK/NACK determination for the k HARQ bursts may be multiplexed in at least k symbols in the time domain, or by a P-matrix code in the spatial domain.

The k HARQ bursts may be allocated to the same STA or k STAs.

The specific sequence may be a long training field (LTF) sequence of the HARQ feedback frame.

The HARQ feedback frame may be a null data packet (NDP) frame, and one tone set may include a total of 12 tones, and each subset includes 6 tones.

Advantageous Effects

According to an embodiment of the present disclosure, a plurality of sets of tones are configured in a band in which a hybrid automatic repeat request (HARQ) feedback frame is transmitted, to support transmission of acknowledgments/ negative acknowledgments (ACKs/NACKs) for a plurality of HARQ bursts. Further, each set of tones are divided into a subset of tones for an ACK and a subset of tones for a NACK. Accordingly, an ACK and a NACK may be distinctly distinguished from each other and thus transmitted and received accurately and efficiently.

Other technical effects in addition to the above-described effects may be inferred from embodiments of the present disclosure.

BEST MODE

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described before, the following description is given of a method and apparatus for increasing a spatial reuse rate in a wireless local area network (WLAN) system. To do so, a WLAN system to which the present disclosure is applied will first be described in detail.

Figure 1:
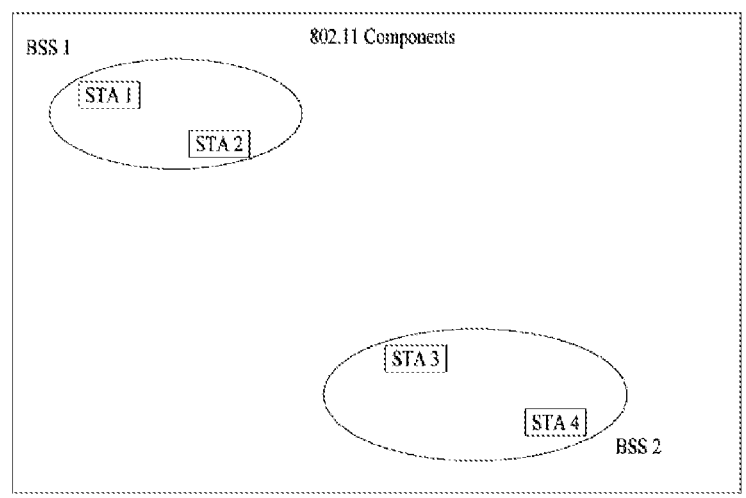
FIG. 1 illustrates an example of a configuration of a wireless local area network (WLAN) system.

FIG. 1 is a diagram illustrating an exemplary configuration of a WLAN system.

As illustrated in FIG. 1, the WLAN system includes at least one basic service set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a wireless transmit/receive unit (WTRU), a user equipment (UE), a mobile station (MS), a mobile terminal, or a mobile subscriber unit.

The AP is an entity that provides access to a distribution system (DS) to an associated STA through a wireless medium. The AP may also be referred to as a centralized controller, a base station (BS), a Node-B, a base transceiver system (BTS), or a site controller.

The BSS may be divided into an infrastructure BSS and an independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
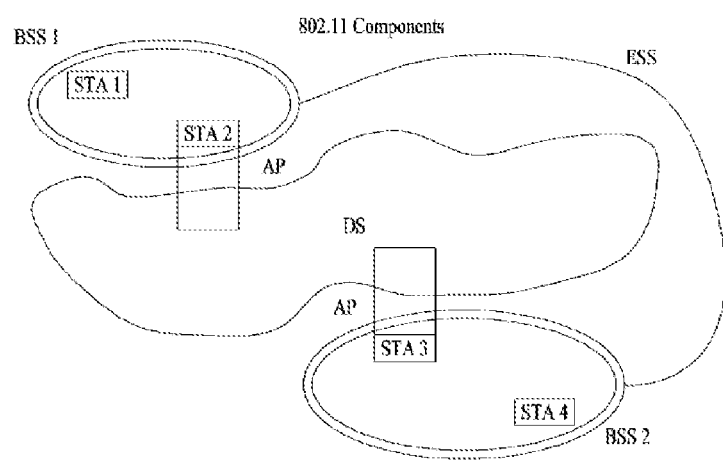
FIG. 2 illustrates another example of a configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an extended service set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a data link layer (DLL). The PHY layer may include a physical layer convergence protocol (PLCP) entity, a physical medium dependent (PMD) entity, and the like. Each of the MAC sublayer and the PHY layer conceptually includes management entities called MAC sublayer management entity (MLME) and physical layer management entity (PLME). These entities provide layer management service interfaces through which a layer management function is executed.

To provide a correct MAC operation, a station management entity (SME) resides in each STA. The SME is a layer independent entity which may be perceived as being present in a separate management plane or as being off to the side. While specific functions of the SME are not described in detail herein, the SME may be responsible for collecting layer-dependent states from various layer management entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
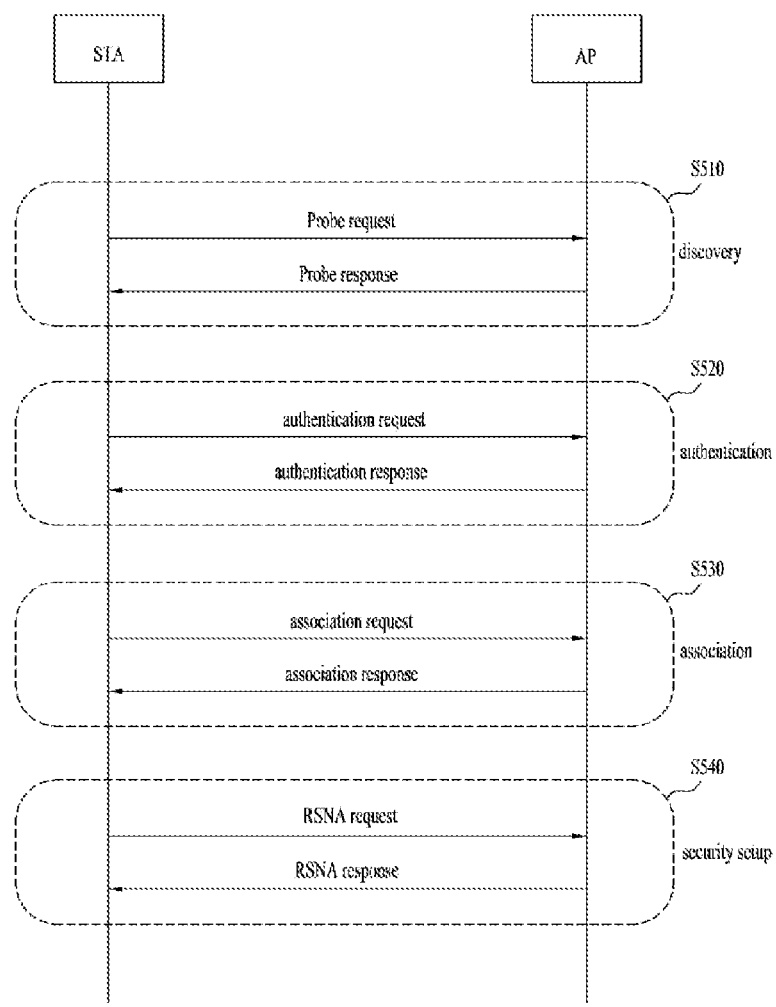
FIG. 3 illustrates a general link setup procedure.

FIG. 3 is a flowchart explaining a general link setup process according to an exemplary embodiment of the present disclosure.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which access point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a service set identifier (SSID), supported rates, supported channels, RSN, mobility domain, supported operating classes, a traffic indication map (TIM) broadcast request, interworking service capability, etc.

For example, the association response frame may include information associated with various capabilities, a state code, an association id (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on robust security network association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an extensible authentication protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of medium access control (MAC) is a carrier sense multiple access with collision avoidance (CSMA/CA) mechanism. The CSMA/CA mechanism is referred to as a distributed coordination function (DCF) of IEEE 802.11 MAC, and basically includes a "Listen Before Talk" access mechanism. In accordance with the above-mentioned access mechanism, the AP and/or STA may perform clear channel assessment (CCA) for sensing an RF channel or medium during a predetermined time interval [for example, DCF inter-frame space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a hybrid coordination function (HCF). HCF is based on DCF and point coordination function (PCF). PCF refers to the polling-based synchronous access scheme in which periodic polling is executed in a manner that all reception (Rx) APs and/or STAs can receive the data frame. In addition, HCF includes enhanced distributed channel access (EDCA) and HCF controlled channel access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving QoS of WLAN, and may transmit QoS data in both a contention period (CP) and a contention free period (CFP).

Figure 4:
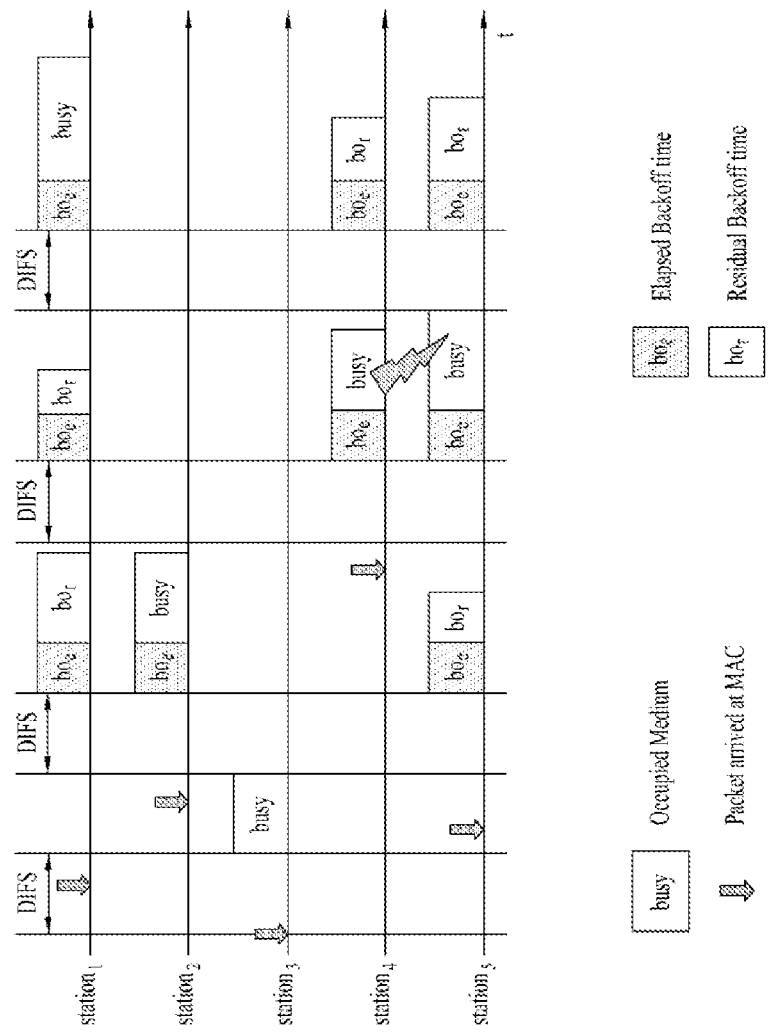
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a packet number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to 2n−1 (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a network allocation vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present disclosure.

Figure 5:
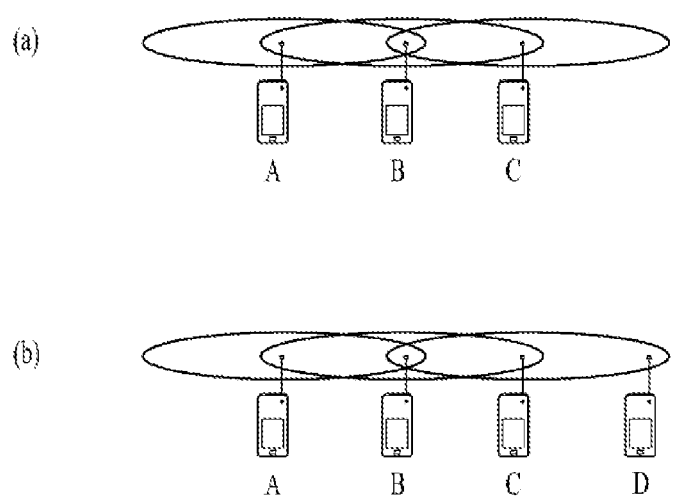
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
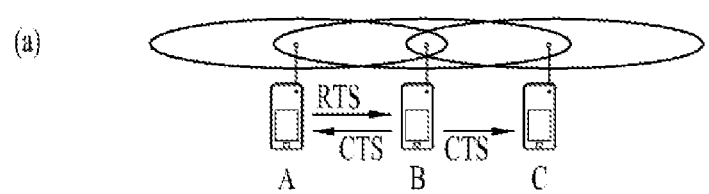
FIG. 6 is an explanatory diagram of ready to send (RTS) and clear to send (CTS).
Figure 6:
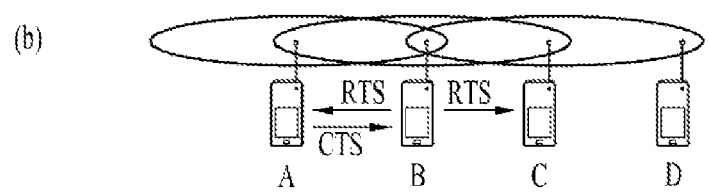

FIG. 6 is a conceptual diagram illustrating request to send (RTS) and clear to send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA is basically operated in the active mode. The STA operating in the active mode maintains an awake state. If the STA is in the awake state, the STA may normally operate such that it can perform frame transmission/reception, channel scanning, or the like.

On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
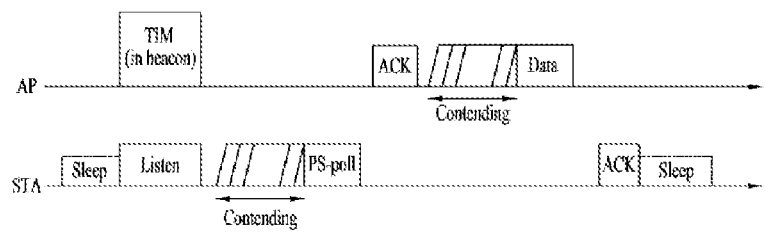
FIGS. 7 to 9 are explanatory diagrams of operation of an STA that has received traffic indication map (TIM).
Figure 8:
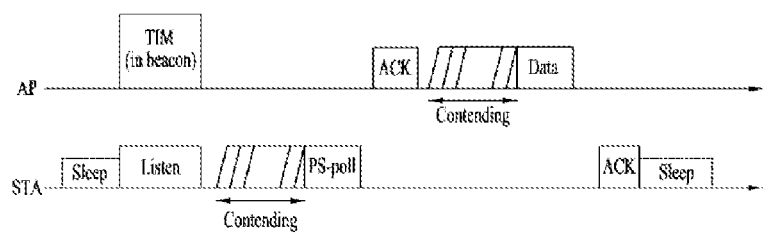
Figure 9:
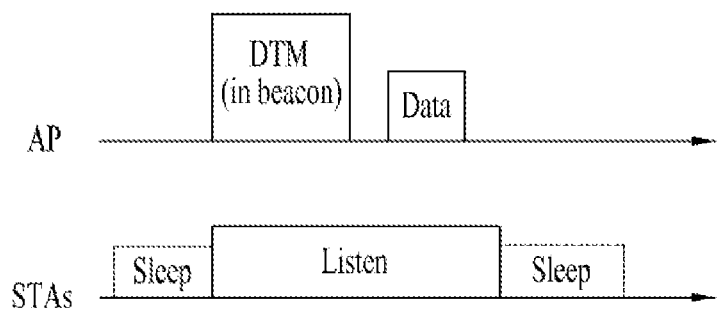

FIGS. 7 to 9 are conceptual diagrams illustrating detailed operations of the STA having received a TIM.

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, short inter-frame space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
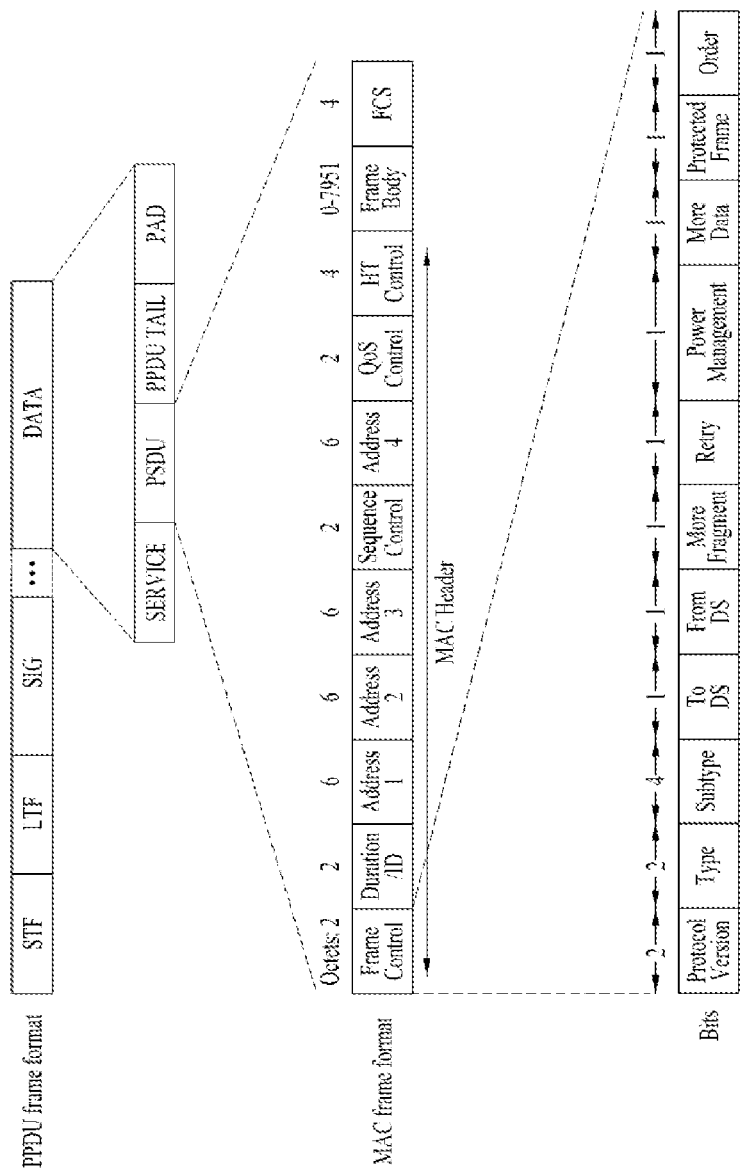
FIG. 10 is an explanatory diagram of an exemplary frame structure used in an IEEE 802.11 system.

FIG. 10 is an explanatory diagram of an exemplary frame structure used in an IEEE 802.11 system.

A PPDU frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, automatic gain control (AGC), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a physical layer service data unit (PSDU) and a PPDU TAIL bit. The data field may also include padding bits as necessary. Some bits of the SERVICE field may be used for synchronization of a descrambler at a receiving end. The PSDU corresponds to an MAC protocol data unit (MPDU) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and a frame check sequence (FCS). The MAC frame may be composed of the MPDU and transmitted/received through PSDU of a data part of the PPDU frame format.

128[ ] The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and subtype, whether transmission is performed for a contention free period (CFP), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a point coordinator (PC) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (µs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
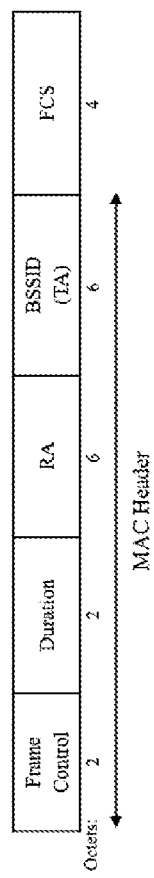
FIG. 11 illustrates a contention free-(CF)-END frame.
Figure 12:
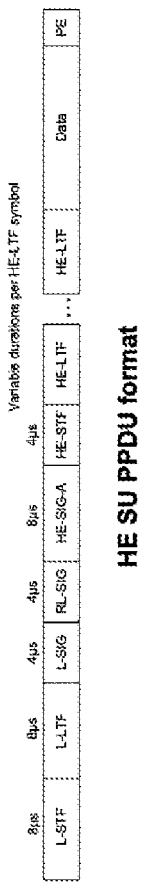
FIGS. 12 to 15 illustrate high efficiency (HE) physical layer protocol data units (PPDUs).
Figure 13:
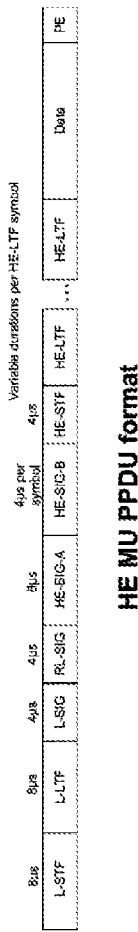
Figure 14:
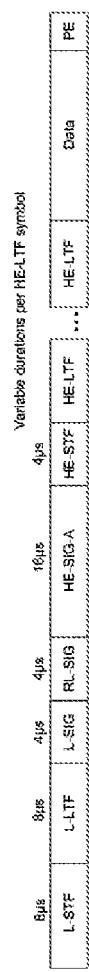
Figure 15:
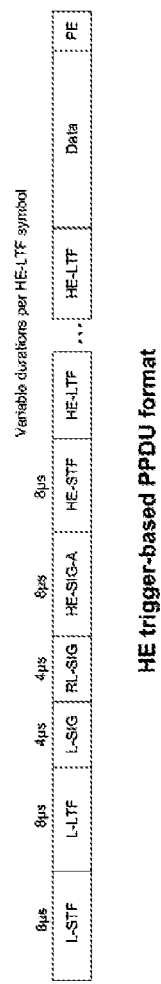

FIG. 11 illustrates a contention free-(CF)-END frame.

For convenience of description, it is assumed that CF-END frame is transmitted by a non-DMG (directional multi-gigabit, 11ad) STA. The CF-END frame may be transmitted for truncation of TXOP duration. Therefore, a duration field is set to 0 in the CF-END frame. RA (Receiver Address) field may be set to a broadcast group address. A BSSID field may be set to an address of STA included in AP. However, in case of CF-END frame of a non-HT or non-HT duplicate format transmitted from VHT STA to VHT AP, Individual/Group of BSSID field may be set to 1.

Example of HE PPDU Structure

Hereinafter, examples of high efficiency physical layer protocol data unit (HE PPDU) format in a wireless LAN system that supports 11ax will be described.

FIGS. 12 to 15 illustrate HE PPDUs.

HE-SIG A field is located next to L-Part (e.g., L-STF, L-LTF, L-SIG), and is duplicated in a unit of 20 MHz in the same manner as L-Part. HE-SIG A may be included in all HE PPDUs, whereas HE-SIG B may be omitted from SU PPDU and UL trigger based PPDU (e.g., UL PPDU transmitted based on trigger frame).

HE-SIG A includes common control information (e.g., BW, GI length, BSS Color, CRC, Tail, etc.) on STAs. The HE-SIG A field includes information for interpreting HE PPDU, and therefore information included in the HE-SIG A field may be varied depending on a format (e.g., SU PPDU, MU PPDU or trigger based PPDU, etc.) of HE PPDU.

For example, (i) in HE SU PPDU format, the HE-SIG A field may include at least one of DL/UL indicator, HE PPDU format indicator, BSS Color, TXOP Duration, BW (bandwidth), MCS, CP+LTF length, coding information, the number of streams, STBC (e.g., whether STBC has been used), transmission beamforming (TxBF) information, CRC and Tail. In case of the HE SU PPDU format, the HE-SIG B field may be omitted. (ii) in HE MU PPDU format, the HE-SIG A field may include at least one of DL/UL indicator, BSS Color, TXOP Duration, BW (bandwidth), MCS information of the SIG B field, the number of symbols of the SIG B field, the number of HE LTF symbols, an indicator indicating whether full bandwidth MU-MIMO has been used, CP+LTF length, transmission beamforming (TxBF) information, CRC and Tail. (iii) in HE trigger based PPDU format, the HE-SIG A field may include at least one of a format indicator (e.g., SU PPDU or trigger based PPDU), BSS Color, TXOP Duration, BW, CRC and Tail.

In addition to the aforementioned common information, at least one of user allocation information, for example, STA identifier such as PAID or GID, allocated resource information and the number of streams (Nsts) may be included in HE-SIG A.

BSS color information included in the HE-SIG A field is information for identifying BSS, and has a length shorter than BSSID. For example, BSSID has a length of 48 bits, whereas the BSS color information may have a length of 6 bits. The STA may determine whether the BSS color information is an intra-BSS frame. That is, the STA may an identify intra BSS PPDU from an inter BSS PPDU through the BSS color information even though the HE-SIG A field is only decoded without fully decoding HE PPDU.

The HE-SIG B may independently be encoded per 20 MHz channel unit. The HE-SIG B encoded per 20 MHz channel may be referred to as HE-SIG-B content channel.

According to one embodiment, if a bandwidth is not greater than 20 MHz, one HE-SIG B content channel may be transmitted. If the bandwidth is greater than 20 MHz, 20 any one of a first HE-SIG B content channel (hereinafter, HE-SIG B [1]) or a second HE-SIG B content channel (hereinafter, HE-SIG B [2]) in MHz sized channels may be transmitted. For example, HE-SIG B [1] and HE-SIG B [2] may be transmitted alternately. As an odd numbered 20 MHz channel, HE-SIG B [1] may be transmitted, and as an even numbered 20 MHz channel, HE-SIG B [2] may be transmitted. In more detail, in case of 40 MHz bandwidth, HE-SIG B [1] is transmitted on the first 20 MHz channel, and HE-SIG B [2] is transmitted on the second 20 MHz channel. In case of 80 MHz bandwidth, HE-SIG B [1] is transmitted on the first 20 MHz channel, HE-SIG B [2] is transmitted on the second 20 MHz channel, the same HE-SIG B [1] is repeatedly transmitted on a third 20 MHz channel, and the same HE-SIG B [2] is repeatedly transmitted on a fourth 20 MHz channel. Similarly, the HE-SIG B [1] and the HE-SIG B [2] are transmitted even in case of 160 MHz bandwidth.

Meanwhile, contents of the HE-SIG B [1] may be different from those of the HE-SIG B [2]. However, all of the HE-SIG-B [1] have the same contents. Likewise, all of the HE-SIG B [2] have the same contents.

The HE-SIG B may include a common field and a user specific field. The common field may be prior to the user specific field. The common field and the user specific field may be identified from each other by a bit unit not OFDM symbol unit.

The common field of the HE-SIG B includes information on all of STAs designated to receive PPDU at a corresponding bandwidth. The common field may include resource unit (RU) allocation information. For example, when four 20 MHz channel constituting 80 MHz are identified by [LL, LR, RL, RR], a common block of LL and RL may be included in the common field of the HE-SIG B [1], and a common block of LR and RR may be included in the common field of the HE-SIG B [2].

The user specific field of the HE-SIG B may include multiple user fields, each of which may include specific information in an individual STA designated to receive PPDU. For example, the user field may include at least one of, but not limited to, station ID, MCS per STA, the number of streams (Nsts), Coding (e.g., indication of LDPC use), DCM indicator and transmission beamforming information).

Figure 16:
FIG. 16 illustrates an HE trigger-based (TP) null data packet (NDP) PPDU.

FIG. 16 illustrates an HE trigger-based (TB) null data packet (NDP) feedback PPDU.

The HE TB NDP feedback PPDU is used to deliver NDP feedback report information. The HE TB NDP feedback PPDU uses an HE TB PPDU format with PE duration=0 without the Data field. The TB NDP feedback PPDU has two 4×HE-LTF symbols. In the TB NDP feedback PPDU, 4×HE-LTF and $T_{GI4,Data}$ is the only combination of an HE LTF mode and a GI length. HE STF and pre HE modulation fields are transmitted only on a 20-MHz channel to which an STA is assigned.

The HE LTF symbols of the HE TB NDP feedback PPDU are generated as follows.

HE LTF is provided to a receiver, for MIMO channel estimation. Only 4×HE-LTF is used for the HE LTF of the HE TB NDP feedback PPDU, and defined as [Equation 1].

$$HELTF_{k,u}^{TB\_NDP} = \begin{cases} HELTF_k, & \text{if } k \in K_{tone\_NDPu} \\ 0, & \text{otherwise} \end{cases} \quad \text{[Equation 1]}$$

HELTFk is a common HE LTF sequence on subcarrier k, which is generated by 4×HE LTF equations according to a channel width. $K_{tone\_NDPu}$ represents subcarrier indices for user u, and is defined as Table 1 below according to the indices of RU tone sets and feedback statuses.

TABLE 1

| | 80 MHz | | 40 MHz | | 20 MHz | |
| --- | --- | --- | --- | --- | --- | --- |
| RU_TONE_SET_INDEX | $K_{tone\ NDPu}$ if FEED-BACK_STATUS is 1 | $K_{tone\ NDPu}$ if FEED-BACK_STATUS is 0 | $K_{tone\ NDPu}$ if FEED-BACK_STATUS is 1 | $K_{tone\ NDPu}$ if FEED-BACK_STATUS is 0 | $K_{tone\ NDPu}$ if FEED-BACK_STATUS is 1 | $K_{tone\ NDPu}$ if FEED-BACK_STATUS is 0 |
| 1 | Use 20 MHz FEED-BACK_STATUS = 1 Subcarrier Indices − 384 | Use 20 MHz FEED-BACK_STATUS = 0 Subcarrier Indices − 384 | Use 20 MHz FEED-BACK_STATUS = 1 Subcarrier Indices − 128 | Use 20 MHz FEED-BACK_STATUS = 0 Subcarrier Indices − 128 | −113, −77, −41, 6, 42, 78 | −112, −76, −40, 7, 43, 79 |
| 2 | | | | | −111, −75, −39, 8, 44, 80 | −110, −74, −38, 9, 45, 81 |
| 3 | | | | | −109, −73, −37, 10, 46, 82 | −108, −72, −36, 11, 47, 83 |
| 4 | | | | | −107, −71, −35, 12, 48, 84 | −106, −70, −34, 13, 49, 85 |
| 5 | | | | | −105, −69, −33, 14, 50, 86 | −104, −68, −32, 15, 51, 87 |
| 6 | | | | | −103, −67, −31, 16, 52, 88 | −102, −66, −30, 17, 53, 89 |
| 7 | | | | | −101, −65, −29, 18, 54, 90 | −100, −64, −28, 19, 55, 91 |

TABLE 1-continued

| RU_TONE_SET_INDEX | 80 MHz | | 40 MHz | | 20 MHz | |
|---|---|---|---|---|---|---|
| | $K_{tone\ NDPu}$ if FEEDBACK_STATUS is 1 | $K_{tone\ NDPu}$ if FEEDBACK_STATUS is 0 | $K_{tone\ NDPu}$ if FEEDBACK_STATUS is 1 | $K_{tone\ NDPu}$ if FEEDBACK_STATUS is 0 | $K_{tone\ NDPu}$ if FEEDBACK_STATUS is 1 | $K_{tone\ NDPu}$ if FEEDBACK_STATUS is 0 |
| 8 | | | | | −99, −63, −27, 20, 56, 92 | −98, −62, −26, 21, 57, 93 |
| 9 | | | | | −97, −61, −25, 22, 58, 94 | −96, −60, −24, 23, 59, 95 |
| 10 | | | | | −95, −59, −23, 24, 60, 96 | −94, −58, −22, 25, 61, 97 |
| 11 | | | | | −93, −57, −21, 26, 62, 98 | −92, −56, −20, 27, 63, 99 |
| 12 | | | | | −91, −55, −19, 28, 64, 100 | −90, −54, −18. 29, 65, 101 |
| 13 | | | | | −89, −53, −17, 30, 66, 102 | −88, −52, −16, 31, 67, 103 |
| 14 | | | | | −87, −51, −15, 32, 68, 104 | −86, −50, −14, 33, 69, 105 |
| 15 | | | | | −85, −49, −13, 34, 70, 106 | −84, −48, −12, 35, 71, 107 |
| 16 | | | | | −83, −47, −11, 36, 72, 108 | −82, −46, −10, 37, 73, 109 |
| 17 | | | | | −81, −45, −9, 38, 74, 110 | −80, −44, −8, 39, 75, 111 |
| 18 | | | | | −79, −43, −7, 40, 76, 112 | −78, −42, −6, 41, 77, 113 |
| 19-36 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 37-54 | Use 20 MHz FEEDBACK_STATUS = 1 Subcarrier Indices + 128 | Use 20 MHz FEEDBACK_STATUS = 0 Subcarrier Indices + 128 | | | | |
| 55-72 | Use 20 MHz FEEDBACK_STATUS = 1 Subcarrier Indices + 384 | Use 20 MHz FEEDBACK_STATUS = 0 Subcarrier Indices + 384 | | | | |

The RU_TONE_SET_INDEX for 80 + 80 MHz and 160 MHz shall use the 80 MHz RU_TONE_SET_INDEX definition for the lower and upper 80 MHz.
The RU_TONE_SET_INDEX values 1-72 are mapped to the lower 80 MHz and the RU_TONE_SET_INDEX values 73-144 are mapped to the upper 80 MHz.

NDP Feedback Report Poll variant: In an NDP feedback report poll trigger frame, an RA field is set to a broadcast address. A BW subfield indicates the BW of an NDP feedback report response. A CS Request subfield may be set to 0. STBC, LDPC Extra Symbol Segment, Packet Extension, and Doppler subfields are reserved. A Number of HE-LTF Symbols subfield in a Common Info field indicates the number of HE-LTF symbols in the NDP feedback report response, and is set to 2 for 2 HE-LTF symbols. A GI and LTF Type subfield in the Common Info field is set to 2. A Trigger Dependent Common Info subfield is not provided. A User Info field includes a Starting AID subfield, a Reserved subfield, a Feedback Type subfield, a Reserved subfield, a Target RSSI subfield, and a Multiplexing Flag subfield. The Feedback Type subfield is defined as shown in Table 2.

TABLE 2

| Value | Description |
|---|---|
| 0 | Resource request |
| 2-15 | Reserved |

A scheduled HE Non-AP STA is identified by an AID range. The Starting AID field defines the first AID of a range of AIDs scheduled to respond to the NDP feedback report poll trigger frame. A Target RSSI subfield indicates the target RSSI power of an NDP feedback report response for every scheduled STA. The resolution of the Target RSSI subfield is 1 dB.

$N_{STA}$ representing the total number of STAs scheduled to respond to the NDP feedback report poll trigger frame is given by Equation 2.

$$N_{STA}=18\times 2^{BW}\times(\text{MultiplexingFlag}) \quad \text{[Equation 2]}$$

In Equation 2, BW is a value indicated in the BW subfield of the NDP feedback report poll trigger frame, and Multiplexing Flag is a value indicated by the Multiplexing Flag subfield of the NDP feedback report poll trigger frame. The Multiplexing Flag subfield indicates the number of STAs multiplexed with P-matrix codes in the same tone set of the same RU, and is encoded to the number of STAs−1.

NDP Feedback Report Procedure

NDP feedback reporting is a mechanism in which an HE AP collects short feedbacks from multiple HE STAs in a more efficient manner than an HE TB PPDU. The feedbacks (e.g., resource requests) are transmitted without data payload in response to a trigger frame. The feedbacks are not intended for channel sounding.

The HE AP requests NDP feedback report responses from multiple STAs identified by a range of AIDs scheduled in an NDP feedback poll trigger frame by transmitting the NDP feedback report poll trigger frame. An NDP feedback report response from an HE non-AP STA is an HE TB PPDU with no data payload. The HE non-AP STA determines whether it has been scheduled based on information delivered in the NDP feedback report poll trigger frame, and if scheduled, acquires parameters for response transmission.

(i) STA Operation

If an STA supports NDP feedback reporting, the STA should set an NDP Feedback Report Support subfield of an HE Capabilities element to 1, and otherwise, to 0.

Unless one of the operation modes described below is explicitly activated by an AP, the STA should not transmit an NDP feedback report response. The frame spacing between an NDP feedback report poll trigger frame and a PPDU including the NDP feedback report poll response is an SIFS. When all of the following conditions are met, the STA transmits the NDP feedback report response at an SIFS time boundary after the received PPDU ends. The conditions are given as follows.

The received PPDU includes an NDP feedback report poll trigger frame.

The STA is scheduled by the NDP feedback report poll trigger frame.

The NDP Feedback Report Support subfield of the HE MAC Capabilities Information field is set to 1.

The STA provides a response to NDP Feedback Type included in the NDP feedback report poll trigger frame.

If the STA does not satisfy all of the above conditions, the STA does not need to respond to the NDP feedback report poll trigger frame.

If the AID of the STA is equal to or greater than a starting AID and less than an AID+$N_{STA}$ start, the STA is scheduled to use the Start AID subfield in the eliciting trigger frame and respond to the NDP feedback report poll trigger frame by using $N_{STA}$. The number of STAs scheduled to respond to the NDP feedback report poll trigger frame, $N_{STA}$ is calculated by $N_{STA}=18\times2^{BW}\times$(Multiplexing Flag) based on the BW subfield and the Multiplexing Flag subfield of the eliciting trigger frame.

Transmission of the HE NDP feedback report response: The STA transmitting the NDP feedback report response to the trigger frame sets TXVECTOR parameters in a similar manner to transmission of an HE TB PPDU in response to a trigger frame, except for the following differences which are given as follows.

FORMAT is set to HE_TRIG.

PSDU_LENGTH is set to 0.

RU_ALLOCATION is set to the maximum RU size of a BW.

RU_TONE_SET_INDEX is set to RU_TONE_SET_INDEX=(AID-starting AID) mod $(18\times2^{BW})$ based on the value of the Starting AID subfield in the User Info field of the trigger frame.

NUM_STS is set to 1

STARTING_STS_NUM is set by the following equation:

STARTING_STS_NUM=(Floor ((AID-Starting AID)/18/$2^{BW}$), along with the value of the Starting AID subfield in the User Info field of the trigger frame.

MCS is set to 0.

DCM is set to 0.

FEC_CODING is set to 0.

TXPWR_LEVEL_INDEX should be set to a value based on transmission power control of the HE TB PPDU, and is based on the values of the AP Tx Power subfield and the Target RSSI subfield in the User Info field of the trigger frame.

The STA which is to transmit the NDP feedback report response to the trigger frame should modulate allocated tones as follows.

Each STA scheduled to provide a feedback report is allocated STARTING_STS_NUM and RU_TONE_SET of 12 tones to transmit bit FEEDBACK_STATUS. The set of 12 tones for each STA is divided into two groups each including six tones.

When FEEDBACK_STATUS=1, the STA transmits energy only in the 6 tones of the first group among the 12 tones of RU_TONE_SET allocated by RU_allocation for the STA.

When FEEDBACK_STATUS=0, the STA transmits energy only in the 6 tones of the second group among the 12 tones of RU_TONE_SET allocated by RU_allocation for the STA.

(ii) AP Operation

Reception of NDP feedback report responses: A plurality of STAs may transmit NDP feedback report responses to an AP in response to an NDP feedback report poll trigger frame transmitted by the AP. Based on an RXVECTOR parameter, NDP_REPORT, which provides a vector of detected bits for each P-matrix code of each RU_TONE_SET_INDEX, the AP may derive a list of AIDs from which the NDP feedback report responses have been transmitted, and the responses. The AP should not transmit any ACK in response to reception of the NDP feedback report responses.

NDP feedback report with resource request type: An HE AP may transmit an NDP feedback report poll trigger frame with a Type subfield set to "0" for a "resource request". When the Feedback Type subfield of the User Info field of the NDP feedback report poll trigger frame is set to 0 for the "resource request", a scheduled STA may queue a packet that it has and transmit an NDP feedback report response to inform the AP that it wants a trigger in UL MU.

Each STA scheduled to provide a feedback report is allocated STARTING_STS_NUM and RU_TONE_SET_INDEX of 12 tones to transmit a bit FEEDBACK_STATUS.

The meanings of the values of a corresponding bit b are listed in Table 3.

TABLE 3

| Value | Description |
|---|---|
| 0 | Resource request with buffered bytes for transmission between 1 and the Resource request buffer threshold. |
| 1 | Resource request with buffered bytes for transmission above the Resource request buffer threshold. |

A resource request buffer threshold is equal to $2^{(resource\ request\ buffer\ threshold)}$ octets based on the Resource Request Buffer Threshold subfield of a latest received NDP Feedback Report Parameter Set element transmitted by the AP with which the STA has associated. If the NDP Feedback Report Parameter Set element t has not been transmitted by the AP with which the STA has associated, the resource request buffer threshold is equal to 256 octets.

HARQ Feedback Frame Format for WLAN

In HARQ, to finally receive correct data, an initial transmission may be combined with a retransmission, and data may be received successfully even with a small number of retransmissions.

Although an ARQ protocol is used in the legacy WLAN, an HARQ process may be introduced to the next-generation WLAN, for more active MCS selection and the increase of a data rate at a cell edge.

In the next-generation WLAN system to which HARQ is introduced, a transmitting STA configures and transmits an HARQ burst (HARQ frame or HARQ PPDU). The HARQ burst may refer to unit data to which an HARQ process is applied.

A method of configuring and transmitting a response frame (e.g., HARQ feedback frame/PPDU) for an HARQ burst (HARQ frame or HARQ PPDU) by a receiving STA which has received the HARQ burst will be described below.

For example, upon receipt of a PPDU including HARQ data (e.g., HARQ MU/SU PPDU), the receiving STA may transmit an HARQ feedback frame to the transmitting STA in response to the PPDU including HARQ data. The HARQ feedback frame may include HARQ feedback information indicating whether the reception result is ACK or NACK. The receiving STA may transmit the HARQ feedback information in the form of an NDP by using a sequence.

Figure 17:
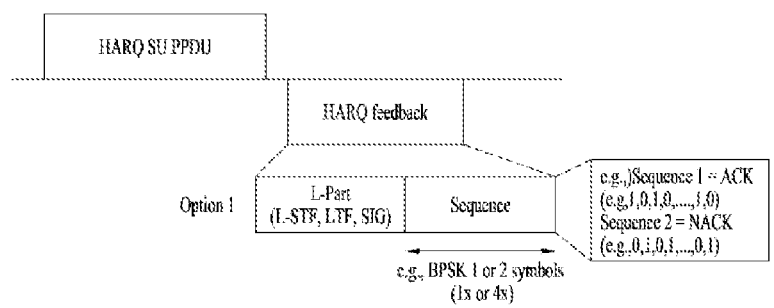
FIG. 17 illustrates an exemplary transmission of a hybrid automatic repeat request (HARQ) feedback frame.

FIG. 17 illustrates an exemplary transmission of an HARQ feedback frame.

Referring to FIG. 17, an L-Part (e.g., L-STF, L-LTF, and L-SIG) may be located at the start of the HARQ feedback frame, followed by a sequence indicating ACK/NACK. A specific sequence available to the sequence part may indicate ACK, and another specific sequence available to the sequence part may indicate NACK.

For example, Sequence=1, 0, 1, 0, . . . , 1, 0 may indicate ACK, and Sequence=0, 1, 0, 1, . . . , 0, 1 may indicate NACK. Various values are available for the sequences. In FIG. 17, the sequence includes BPSK 1-symbol or 2-symbol, which may be one of 1× symbol, 2× symbol, and 4× symbol. The value of the sequence may vary according to a sequence configuration. A 4× symbol has a time duration four times larger than the time duration of a 1× symbol, and the SCS of the 4× symbol may be ¼ of the SCS of the 1× symbol.

In another example, an LTF sequence (e.g., VHT-LTF or HE-LTF sequence) may be used as a sequence indicating ACK/NACK in the HARQ feedback frame. For example, the LTF sequence may be divided into two sets of logical tones (e.g., subcarriers). When energy is detected in the tones of a first tone set with no energy in the tones of a second tone set, this may be defined as ACK. On the contrary, when energy is detected in the tones of the second tone set with no energy in the tones of the first tone set, this may be defined as NACK. The STA transmitting the HARQ feedback frame in this manner may determine which tone set to be transmitted with energy according to ACK/NACK. Further, an STA receiving the HARQ feedback frame may determine the ACK/NACK according to the tone set in which energy is detected.

In another example, two different sequences (e.g., LTF and STF sequence0) may be used. For example, an STA transmitting an HARQ feedback frame may transmit a first sequence for ACK and a second sequence for NACK, as illustrated in FIG. 17.

The present disclosure may represent ACK/NACK by using sequences in various manners, not limited to the above methods.

Figure 18:
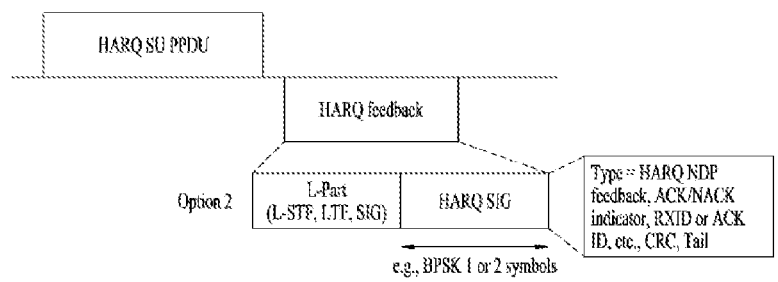
FIG. 18 illustrates a method of representing an ACK/NACK in the form of SIG in an HARQ feedback frame.

FIG. 18 illustrates a method of representing ACK/NACK in the form of SIG in an HARQ feedback frame. Referring to FIG. 18, HARQ-SIG may include a Type field. In FIG. 18, the Type field may be set to a value indicating that a corresponding frame is an HARQ NDP feedback frame. The HARQ-SIG field may include ACK/NACK indication information. Additionally, the HARQ-SIG field may include an RXID or an ACK ID.

Figure 19:
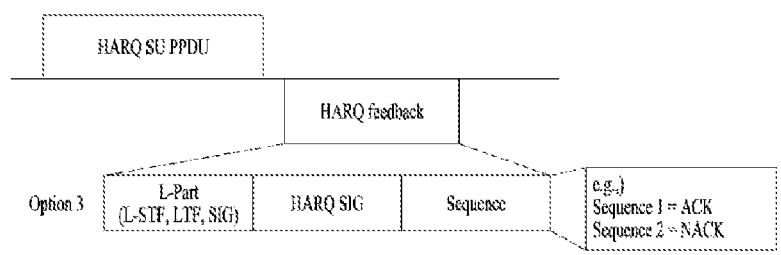
FIG. 19 illustrates another exemplary HARQ feedback frame.

FIG. 19 illustrates another exemplary HARQ feedback frame.

Referring to FIG. 19, HARQ SIG may be located before a sequence indicating ACK/NACK. Various sequences described with reference to FIG. 17 are available as the sequence indicating ACK/NACK.

Figure 20:
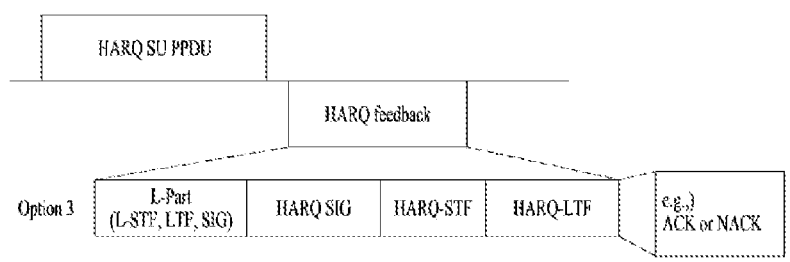
FIG. 20 illustrates another exemplary HARQ feedback frame.

FIG. 20 illustrates another exemplary HARQ feedback frame.

Referring to FIG. 20, an L-Part is followed by HARQ-SIG, HARQ-STF, and HARQ-LTF, and the HARQ-LTF includes ACK/NACK information.

As described before, in an exemplary method of indicating ACK/NACK by HARQ-LTF, the total tones of the HARQ-LTF part may be divided into two logical TONE_SETs. In this case, detection of energy in the tones of a first tone set with no energy in the tones of a second tone set may be defined as ACK, whereas detection of energy in the tones of the second tone set with no energy in the tones of the first tone set may be defined as NACK. The STA transmitting the HARQ feedback frame in this manner may determine which tone set to be transmitted with energy according to ACK/NACK. Further, the STA receiving the HARQ feedback frame may determine the ACK/NACK according to the tone set in which energy is detected. This is merely an example and thus ACK/NACK may be indicated in any other method described above.

Figure 21:
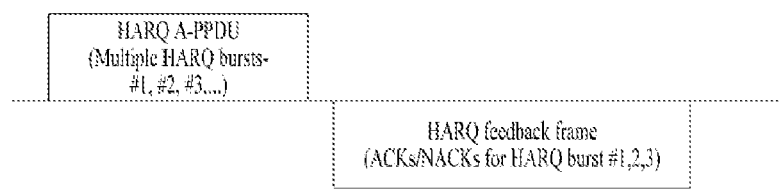
FIG. 21 illustrates another exemplary HARQ feedback frame.

FIG. 21 illustrates another exemplary HARQ feedback frame. In FIG. 21, a transmitted HARQ feedback frame may be a response to reception of an HARQ A-PPDU (e.g., HARQ SU/MU PPDU).

Referring to FIG. 21, an HARQ SU/MU PPDU may include a plurality of HARQ bursts (e.g., Bursts #1, #2 and #3) for a single STA/a plurality of STAs. Upon receipt of the HARQ SU/MU PPDU, a receiving STA transmits an HARQ feedback frame including ACK/NACK information for the multiple HARQ bursts to a transmitting STA.

Figure 22:
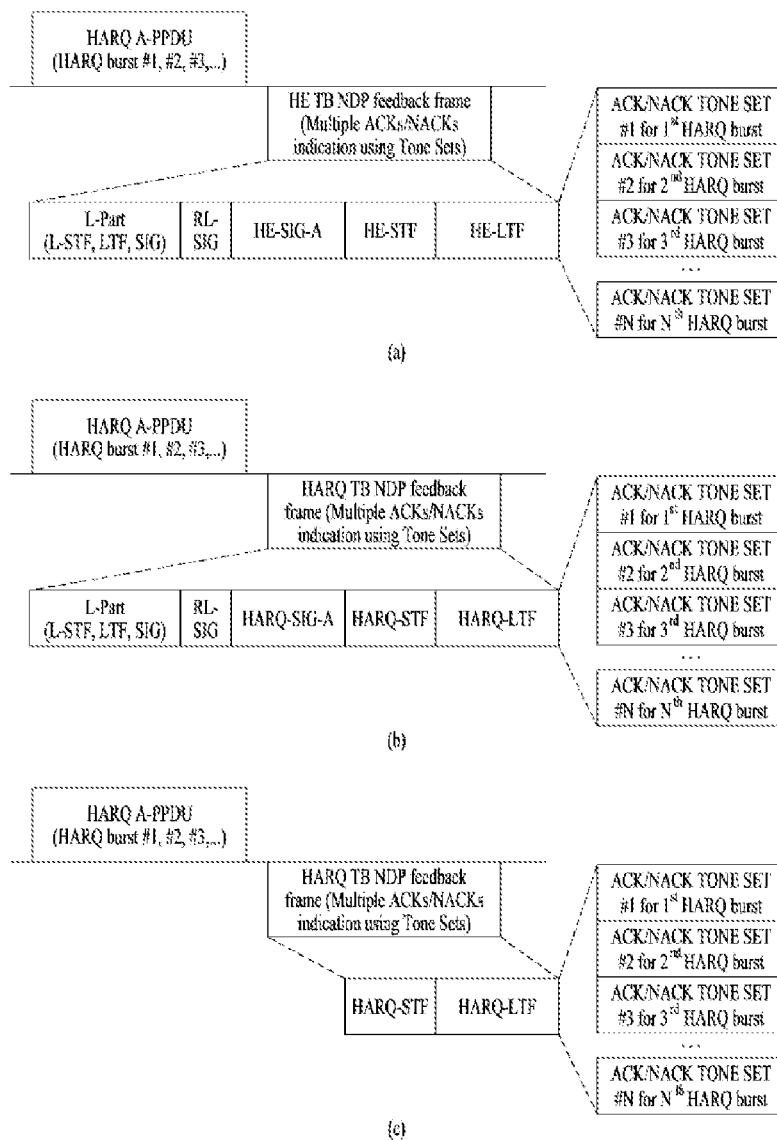
FIG. 22 illustrates another exemplary HARQ feedback frame.

FIG. 22 illustrates another exemplary HARQ feedback frame.

Referring to FIG. 22(a), HARQ ACK/NACK information for multiple HARQ data/bursts may be transmitted in an HE TB NDP feedback PPDU defined for a buffer status report (BSR) in an flax system. Specifically, the total tones are divided into N TONE_SETs each including 12 tones. Each TONE_SET is further divided into two sub-TONE_SETs each including 6 tones. When an STA is to transmit ACK, the STA transmits a sequence (e.g., energy or 1) only in one (e.g., first) of allocated sub-TONE_SETs with no sequence in the other (e.g., second) sub-TONE_SET. When the STA is to transmit NACK, the STA transmits a defined LTF sequence (e.g., energy) only in the second sub-TONE_SET with no sequence in the first sub-TONE_SET. Each TONE_SET may correspond to one HARQ burst. As illustrated in FIG. 22(a), TONE_SET #1 may represent ACK/NACK information for the first HARQ burst, and TONE_SET #2 may represent ACK/NACK information for the second HARQ burst. In FIG. 22(a), HE-STF may be omitted.

While an HE TB NDP feedback frame is reused for transmitting ACK/NACK information in FIG. 22(a), a new HARQ TB NDP feedback frame may be defined for transmitting ACK/NACK information in FIG. 22(b). The HARQ TB NDP feedback frame may be configured in a similar structure to the structure of the HE TB NDP feedback frame. Referring to FIG. 22(b), an HARQ TB NDP feedback PPDU may be in a similar format to the format (L-STF+L-LTF+ L-SIG+RL-SIG+HE-SIG-A+HE-STF+HE-LTF) of the HE TB NDP feedback PPDU. As described above, one or more fields of the L-Part (L-STF, L-LTF, and L-SIG), RL-SIG, HARQ-SIG-A, and HARQ-STF may be omitted.

FIG. 22(c) illustrates an example of transmitting only HARQ-STF and HARQ-LTF in an HARQ feedback frame. The HARQ-LTF indicates ACK/NACK information for multiple HARQ bursts. An STA may transmit and receive an HARQ feedback frame based on 256 FFT/IFFT. In FIGS. 22(a), 22(b) and 22(c), an HARQ A-PPDU may include one or more HARQ bursts (e.g., $1^{st}$ HARQ burst+CRC, $2^{nd}$ HARQ burst+CRC, . . . , $N^{th}$ HARQ burst+CRC). Each of one or more STAs may receive a frame including the multiple HARQ bursts and then transmit ACK/NACK information for the multiple HARQ bursts in an HARQ feedback frame. For example, the STA may transmit the HARQ ACK/NACK information in the HARQ TB NDP feedback frame, similarly to the HE TB NDP feedback frame. In the HARQ TB NDP feedback frame, the L-Part may be successively followed by RL-SIG, HE-SIG-A, HE-STF, and HE(/HARQ)-LTF, and one or more of RL-SIG, HE-SIG-A, and HE-STF may be omitted.

An HE-LTF sequence defined in legacy 11ax or a newly defined sequence may be used for the HE-LTF.

A specific TONE_SET of an HE(/HARQ) LTF sequence may represent ACK/NACK information for specific HARQ data (HARQ burst) (e.g., TONE_SET #1 may represent ACK/NACK information for PPDU #1, and TONE_SET #2 may represent ACK/NACK information for PPDU #2).

If the HARQ TB NDP feedback frame is configured in the same manner as the legacy HE TB NDP feedback frame, one TON SET may include 12 tones (e.g., a first subset including 6 tones and a second subset including 6 tones) for the HE TB NDP feedback frame. When 4×HE-LTF is used in 20 MHz, a total of 18 TONE_SETs may be configured. Therefore, ACK/NACK information may be indicated for up to 18 HARQ bursts.

As illustrated in FIGS. 22(a), 22(b) and 22(c), HARQ ACK/NACK information for an $N^{th}$ PPDU (or HARQ burst) may be mapped to TONE_SET #N. For example, HARQ ACK/NACK information for a first PPDU (or HARQ burst) may be mapped to TONE_SET #1, and HARQ ACK/NACK information for a second PPDU (or HARQ burst) may be mapped to TONE_SET #2.

Figure 23:
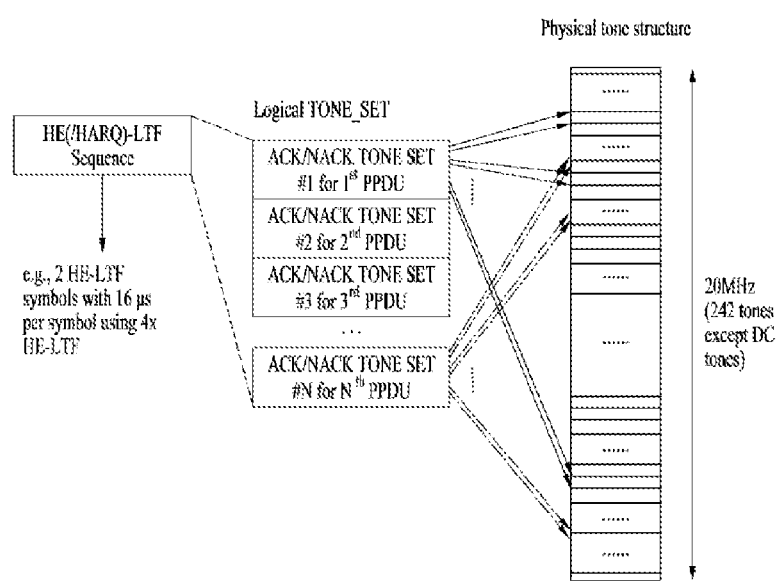
FIG. 23 illustrates an exemplary TONE_SET configuration.

FIG. 23 illustrates an exemplary TONE_SET configuration.

One TONE_SET including 12 tones is a logical TONE_SET, and the 12 tones may actually be distributed physically.

For example, TONE_SET #1 may include a first tone subset of {−113, −77, −41, 6, 42, 78} and a second tone subset of {−112, −76, −40, 7, 43, 79}. When the STA detects energy in the tones of the first subset with no energy in the tones of the second subset, the STA may determine ACK. On the contrary, when the STA detects energy in the tones of the second subset with no energy in the tones of the first subset, the STA may determine NACK. For example, the first tone subset may be mapped to ACK, and the second tone subset may be mapped to NACK. Therefore, when the STA intends to transmit ACK, the STA may transmit a signal only in the first tone subset, and when the STA intends to transmit NACK, the STA may transmit a signal only in the second tone subset. The positions of tones in the TONE_SET and the subsets may be changed.

In the example of FIG. 23, the tones of each TONE_SET may be distributed across a physical tone structure. While FIG. 23 illustrates an example of TONE_SET #1 and TONE_SET #N, the other TONE_SETs may be arranged in the same manner at positions determined in the system.

As described before, a TONE_SET may refer to a logical TONE_SET, and the tones of the TONE_SET may be distributed in the physical domain. While the tones of a TONE_SET are distributed across a total frequency axis in FIG. 23 by way of example, the tones may be distributed in different manners.

The maximum number of HARQ bursts (PPDUs or PSDUs) in an HARQ SU/MU A-PPDU may be limited (e.g., 18 in FIG. 23). In this case, the STA may use an HARQ HE NDP feedback frame with some modification.

Example 1: When the maximum number of HARQ bursts that may be included in an HARQ SU/MU A-PPDU is limited to 9, each TONE_SET includes 24 tones. A total of 9 TONE_SETs may be configured in a bandwidth of 20 MHz. ACK/NACK information for an $N^{th}$ HARQ burst may be mapped to TONE_SET #N, a first subset (e.g., a subset including 12 tones) of each TONE_SET may be mapped to ACK, and a second subset (e.g., a subset including the other 12 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset.

Example 2: When the maximum number of HARQ bursts that may be included in an HARQ SU/MU A-PPDU is limited to 7, each TONE_SET includes 32 tones. A total of 7 TONE_SETs may be configured in the bandwidth of 20 MHz. ACK/NACK information for an $N^{th}$ HARQ burst may be mapped to TONE_SET #N, a first subset (e.g., a subset including 16 tones) of each TONE_SET may be mapped to ACK, and a second subset (e.g., a subset including the other 16 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset.

Example 3: When the maximum number of HARQ bursts that may be included in an HARQ SU/MU A-PPDU is limited to 6, each TONE_SET includes 32 tones. A total of 6 TONE_SETs may be configured in the bandwidth of 20 MHz. ACK/NACK information for an $N^{th}$ HARQ burst may be mapped to TONE_SET #N, a first subset (e.g., a subset including 16 tones) of each TONE_SET may be mapped to ACK, and a second subset (e.g., a subset including the other 16 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset.

Example 4: When the maximum number of HARQ bursts that may be included in an HARQ SU/MU A-PPDU is limited to 5, each TONE_SET includes 48 tones. A total of 5 TONE_SETs may be configured in the bandwidth of 20 MHz. ACK/NACK information for an $N^{th}$ HARQ burst may be mapped to TONE_SET #N, a first subset (e.g., a subset including 24 tones) of each TONE_SET may be mapped to ACK, and a second subset (e.g., a subset including the other 24 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset.

Example 5: When the maximum number of HARQ bursts that may be included in an HARQ SU/MU A-PPDU is limited to 5, each TONE_SET includes 48 tones. A total of 5 TONE_SETs may be configured in the bandwidth of 20 MHz. ACK/NACK information for an $N^{th}$ HARQ burst may be mapped to TONE_SET #N, a first subset (e.g., a subset including 24 tones) of each TONE_SET may be mapped to ACK, and a second subset (e.g., a subset including the other 24 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset.

Example 6: When the maximum number of HARQ bursts that may be included in an HARQ SU/MU A-PPDU is limited to 36, each TONE_SET includes 6 tones. A total of 36 TONE_SETs may be configured in the bandwidth of 20 MHz. ACK/NACK information for an $N^{th}$ HARQ burst may be mapped to TONE_SET #N, a first subset (e.g., a subset including 3 tones) of each TONE_SET may be mapped to ACK, and a second subset (e.g., a subset including the other 3 tones) may be mapped to NACK. For example, when the STA wants to transmit ACK, the STA may transmit a sequence only in the tones included in the first subset, and when the STA wants to transmit NACK, the STA may transmit the sequence only in the tones included in the second subset. Table 4 below illustrates this example.

TABLE 4

| | 20 MHz | | | | | |
|---|---|---|---|---|---|---|
| RU_TONE_SET_INDEX | SubSet#1(Feedback_STATUS is 1) | | | SubSet#2(Feedback_STATUS is 0) | | |
| 1 | −113 | −41 | 42 | −112 | −40 | 43 |
| 2 | −111 | −39 | 44 | −110 | −38 | 45 |
| 3 | −109 | −37 | 46 | −108 | −36 | 47 |
| 4 | −107 | −35 | 48 | −106 | −34 | 49 |
| 5 | −105 | −33 | 50 | −104 | −32 | 51 |
| 6 | −103 | −31 | 52 | −102 | −30 | 53 |
| 7 | −101 | −29 | 54 | −100 | −28 | 55 |
| 8 | −99 | −27 | 56 | −98 | −26 | 57 |
| 9 | −97 | −25 | 58 | −96 | −24 | 59 |
| 10 | −95 | −23 | 60 | −94 | −22 | 61 |
| 11 | −93 | −21 | 62 | −92 | −20 | 63 |
| 12 | −91 | −19 | 64 | −90 | −18 | 65 |
| 13 | −89 | −17 | 66 | −88 | −16 | 67 |
| 14 | −87 | −15 | 68 | −86 | −14 | 69 |
| 15 | −85 | −13 | 70 | −84 | −12 | 71 |
| 16 | −83 | −11 | 72 | −82 | −10 | 73 |
| 17 | −81 | −9 | 74 | −80 | −8 | 75 |
| 18 | −79 | −7 | 76 | −78 | −6 | 77 |
| 19 | −77 | 6 | 78 | −76 | 7 | 79 |
| 20 | −75 | 8 | 80 | −74 | 9 | 81 |
| 21 | −73 | 10 | 82 | −72 | 11 | 83 |
| 22 | −71 | 12 | 84 | −70 | 13 | 85 |
| 23 | −69 | 14 | 86 | −68 | 15 | 87 |
| 24 | −67 | 16 | 88 | −66 | 17 | 89 |
| 25 | −65 | 18 | 90 | −64 | 19 | 91 |
| 26 | −63 | 20 | 92 | −62 | 21 | 93 |
| 27 | −61 | 22 | 94 | −60 | 23 | 95 |
| 28 | −59 | 24 | 96 | −58 | 25 | 97 |
| 29 | −57 | 26 | 98 | −56 | 27 | 99 |
| 30 | −55 | 28 | 100 | −54 | 29 | 101 |
| 31 | −53 | 30 | 102 | −52 | 31 | 103 |
| 32 | −51 | 32 | 104 | −50 | 33 | 105 |
| 33 | −49 | 34 | 106 | −48 | 35 | 107 |
| 34 | −47 | 36 | 108 | −46 | 37 | 109 |
| 35 | −45 | 38 | 110 | −44 | 39 | 111 |
| 36 | −43 | 40 | 112 | −42 | 41 | 113 |

For example, in Table 4, TONE_SET_INDEX #1 is made up of Subset #1 {−113, −41, 42} and Subset #2 {−112, −40, 43}, and TONE_SET_INDEX #36 is made up of Subset #1 {−43, −40, 112} and Subset #2 {−42, 41, 113}.

A total of 36 TONE_SETs may be configured in 20 MHz, a total of 72 TONE_SETs in 40 MHz, and a total of 144 TONE_SETs in 80 MHz.

In addition to Examples 1 to 6, the maximum number of HARQ bursts may be limited to other numbers, and TONE_SET(s) may be configured accordingly. Alternatively, 12 tones may form one TONE_SET.

Figure 24:
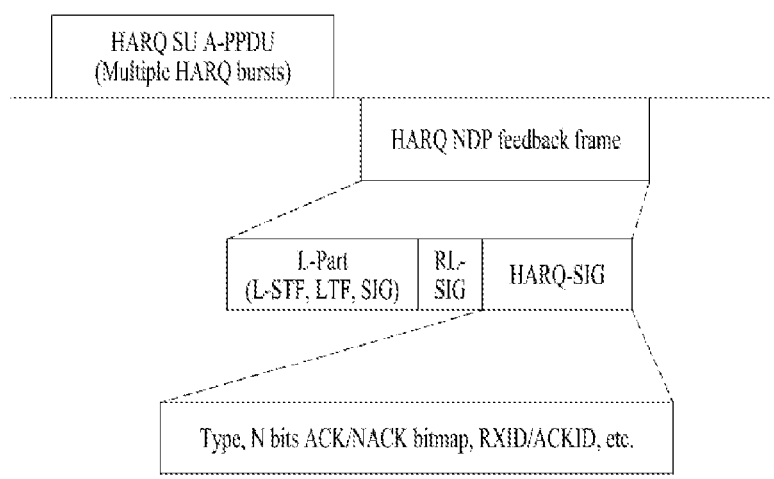
FIG. 24 illustrates an exemplary transmission of ACK/NACK information in an HARQ-SIG field, for an HARQ single user/multi-user (SU/MU) aggregated PPDU (A-PPDU) including multiple HARQ bursts.

FIG. 24 illustrates an example in which ACK/NACK information for an HARQ SU/MU A-PPDU including multiple HARQ bursts is transmitted in an HARQ-SIG field.

In FIG. 24, RL-SIG and HARQ-SIG are located after an L-Part (e.g., L-STF, L-LTF, and L-SIG). In order to include ACK/NACK information for multiple HARQ bursts in HARQ-SIG, an N-bit ACK/NACK bitmap may be included in the HARQ-SIG. Each bit of the ACK/NACK bitmap is mapped to one HARQ burst, indicating whether feedback information for the HARQ Burst is ACK or NACK. Preferably, the value of N is fixed in the system. The HARQ-SIG may include ID information identifying a receiver (or transmitter, optional), such as a BSS Color, an RXID, or an ACK ID.

The afore-mentioned HARQ SU/MU (A-)PPDU may be applied to both DL and UL. A UL HARQ feedback frame may be transmitted in response to a DL HARQ SU/MU (A-)PPDU. A DL HARQ feedback frame may be transmitted in response to a UL HARQ SU/MU (A-)PPDU.

Figure 25:
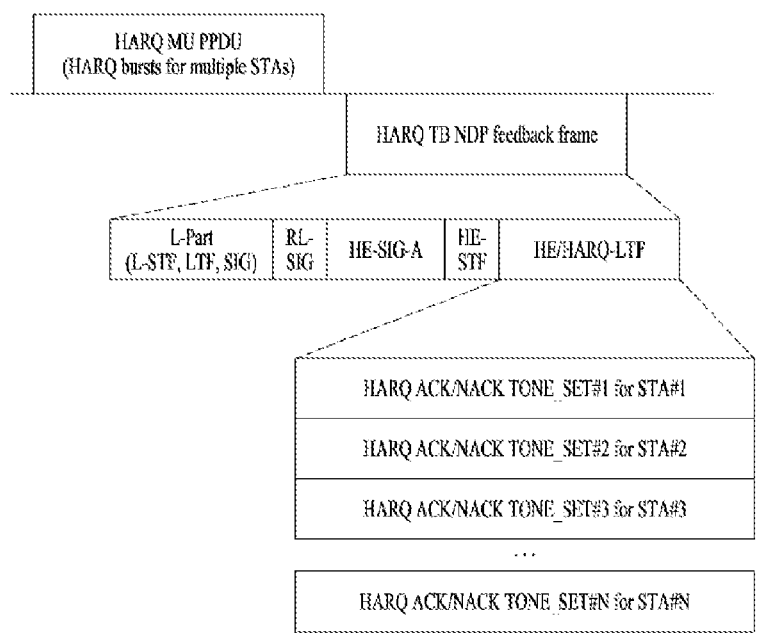
FIG. 25 illustrates another exemplary transmission of an HARQ feedback frame.

FIG. 25 illustrates another exemplary HARQ feedback frame transmission. Specifically, FIG. 25 illustrates an example in which a receiving STA which has received an HARQ MU PPDU including HARQ bursts for multiple STAs (e.g., one HARQ burst is allocated to each STA) transmits an HARQ TB NDP feedback frame.

In the HARQ TB NDP feedback frame, a specific TONE_SET of an HE(/HARQ)-LTF sequence indicates HARQ ACK/NACK information for the HARQ burst of the specific STA. TONE_SET #1 indicates HARQ ACK/NACK information for STA #1, TONE_SET #2 indicates HARQ ACK/NACK information for STA #2, . . . , TONE_SET #N indicates ACK/NACK information for STA #N. When the STA correctly decodes a field (e.g., HARQ-SIG-A/B) including resource allocation information (e.g., an allocated resource unit, MIMO information (the number of spatial streams, etc.), an MCS, etc.) in the HARQ MU PPDU, the STA may determine a TONE_SET for the HARQ TB NDP feedback frame to be transmitted by the STA according to the order of the STAs. For example, the first STA (e.g., STA #1) allocated by the resource allocation information may use TONE_SET #1, the second STA (e.g., STA #2) may use TONE_SET #2, . . . , the $N^{th}$ STA (e.g., STA #N) may use TONE_SET #N.

Since it is assumed that only one stream is mapped to each TONE_SET in the example of FIG. 25, 2 HE-LTF symbols (e.g., HE(/HARQ)-LTF of a total length of 32 us in FIG. 25) for a structure in which two streams are mapped to each TONE_SET. However, when one stream is used in a TONE_SET, only one HE-LTF symbol (e.g., one HE-LTF symbol with 16 us per symbol using 4×HE-LTF, having a total length of 16 us) may be used to reduce the length of HE-LTF. However, the implementation complexity of the STA may increase.

As mentioned above, when 4×HE-LTF is used and each TONE_SET includes 12 tones (it is assumed that 6 tones are used in a first subset and the other 6 tones in a second subset), a total of 18 TON SETs may be configured in a 20-MHz bandwidth. Therefore, assuming that one TONE_SET is used for only one STA, up to 18 STAs may be supported.

To increase the maximum number of supported STAs, P-matrix codes may be used. For example, the number of STAs multiplexed in the same TONE_SET of the same RU may be increased based on P-matrix codes. For convenience, it is assumed that one STA is associated with one stream.

For example, when the number of STAs multiplexed in the same TONE_SET is 1 and the number of streams is 1, up to 18 STAs may be supported, and as described above, one HE-LTF symbol (e.g., 16 us in 4×HE-LTF with 3.2 us GI) or two HE-LTF symbols (e.g., 32 us in 4× HE-LTF with 3.2 us GI) may be used. It may be preferable to use two HE-LTF symbols in terms of implementation complexity.

Figure 26:
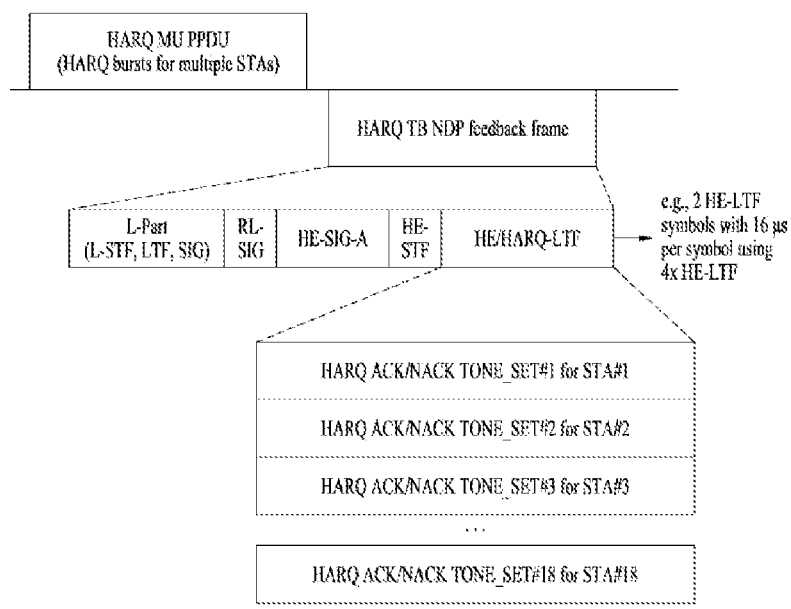
FIG. 26 illustrates an exemplary transmission of ACK/NACK information in two HE-long training field (LTF) symbols.

FIG. 26 illustrates an example of transmitting ACK/NACK information in two HE-LTF symbols.

Referring to FIG. 26, TONE_SET #1 is used for HARQ ACK/NACK transmission of STA #1, TONE_SET #2 is used for HARQ ACK/NACK transmission of STA #2, TONE_SET #3 is STA #3 Used for HARQ ACK/NACK transmission, . . . , and TONE_SET #18 is used for HARQ ACK/NACK transmission of STA #18.

Figure 27:
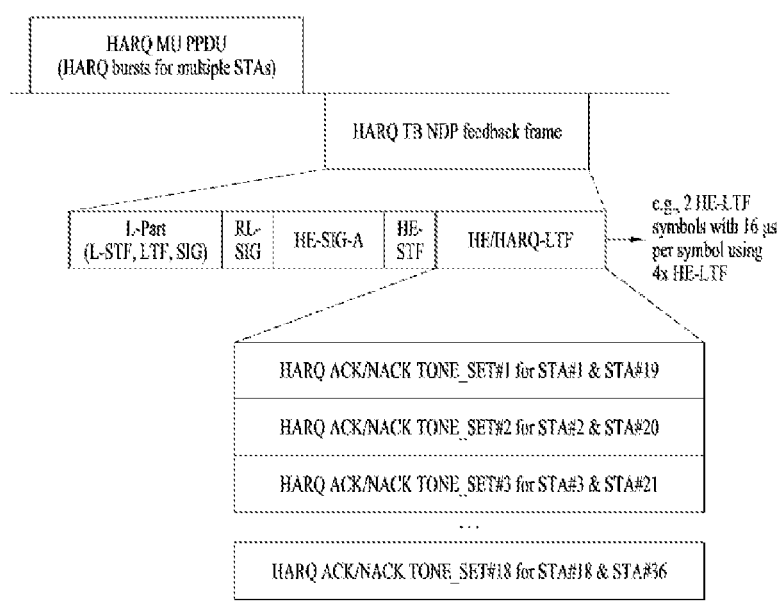
FIG. 27 illustrates another exemplary transmission of ACK/NACK information in two HE-LTF symbols.

FIG. 27 illustrates another example of transmitting ACK/NACK information in two HE-LTF symbols.

Referring to FIG. 27, when the number of STAs multiplexed in one TONE_SET is 2 and the number of streams of each STA is 1, up to 36 STAs may be supported, and two HE-LTF symbols (e.g., 32 us in 4×HE-LTF with 3.2 us GI) may be used.

In FIG. 27, TONE_SET #1 is used for HARQ ACK/NACK transmission of STA #1 and STA #19, TONE_SET #2 is used for HARQ ACK/NACK transmission of STA #2 and STA #20, TONE_SET #3 is used for HARQ ACK/NACK transmission of STA #3 and STA #21, . . . , and TONE_SET #18 is used for HAR # ACK/NACK transmission of STA #18 and STA #36. The steams (or STAs) in each TONE_SET may be distinguished from each other based on stream indices or a starting stream number.

When the number of STAs multiplexed in one TONE_SET is 3 and the number of streams of each STA is 1, up to 54 STAs may be supported, and three HE-LTF symbols (e.g., 48 us in 4× HE-LTF with 3.2 us GI) or four HE-LTF symbols (e.g., 64 us in 4× HE-LTF with 3.2 us GI) may be used. It may be preferable to use four HE-LTF symbols in terms of implementation complexity. In the legacy Wi-Fi (11ac/ax), only four HE-LTF symbols are defined for three STAs.

Figure 28:
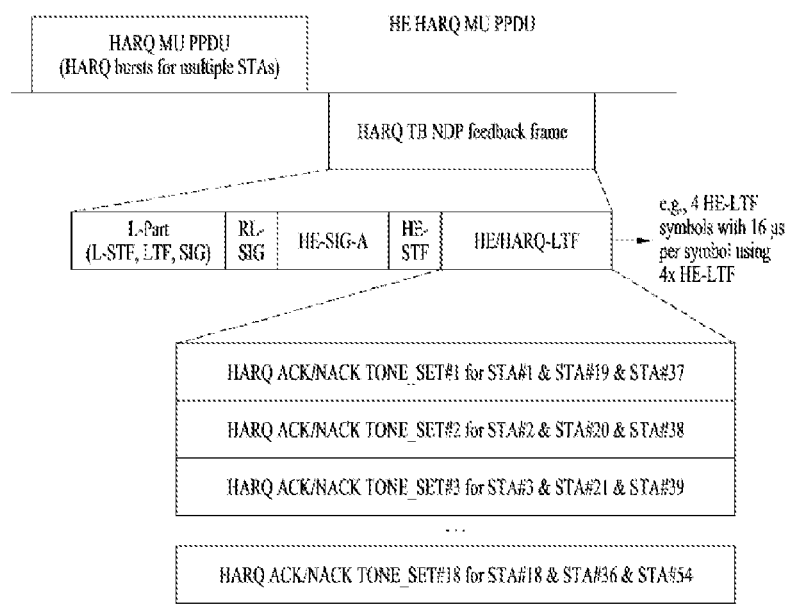
FIG. 28 illustrates another exemplary transmission of ACK/NACK information in four HE-LTF symbols.

FIG. 28 illustrates an example of transmitting ACK/NACK information in four HE-LTF symbols.

In FIG. 28, TONE_SET #1 is used for HARQ ACK/NACK transmission of STA #1, STA #19, and STA #37, TONE_SET #2 is used HARQ ACK/NACK transmission of STA #2, STA #20, and STA #38, TONE_SET #3 is used for HARQ ACK/NACK transmission of STA #3, STA #21 and STA #39, . . . , and TONE_SET #18 is used for HARQ ACK/NACK transmission of STA #18, STA #36 and STA #54. The steams (or STAs) in each TONE_SET may be distinguished from each other based on stream indices or a starting stream number.

Figure 29:
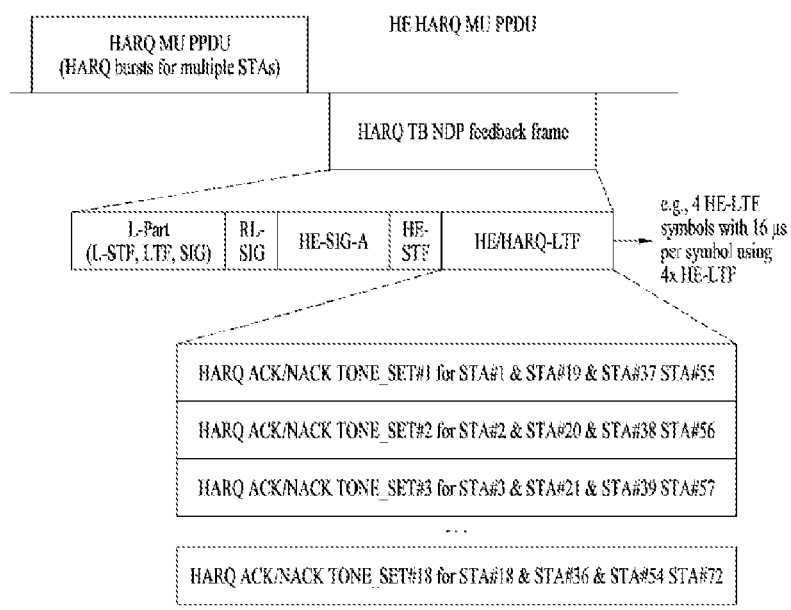
FIG. 29 illustrates another exemplary transmission of ACK/NACK information in four HE-LTF symbols.

FIG. 29 illustrates another example of transmitting ACK/NACK information in four HE-LTF symbols.

When the number of STAs multiplexed in one TONE_SET is 4 and the number of streams of each STA is 1, up to 72 STAs may be supported, and four HE-LTF symbols (e.g., 64 us in 4× HE-LTF with 3.2 us GI) may be used.

In FIG. 29, TONE_SET #1 is used for HARQ ACK/NACK transmission of STA #1, STA #19, STA #37, and STA #55, TONE_SET #2 is used for HARQ ACK/NACK transmission of STA #2, STA #20, STA #38, and STA #56, TONE_SET #3 is used for HARQ ACK/NACK transmission of STA #3, STA #21, STA #39, and STA #57, . . . , and TONE_SET #18 is used for HARQ ACK/NACK transmission of STA #18, STA #36, STA #55 and STA #72. The steams (or STAs) in each TONE_SET may be distinguished from each other based on stream indices or a starting stream number.

A case in which the number of STAs multiplexed in one TONE_SET is 5, 6, 7, or 8 (e.g., when the number of streams of each STA is 1) may also be supported in a similar manner. The number of HE-LTF symbols may be 5 or 6 for 5 STAs (e.g., 6 is preferred), 6 for 6 STAs, 7 or 8 for 7 STAs (e.g., 8 is preferred), and 8 for 8 STAs.

Information about a TONE_SET allocated to a receiving STA may be included in an HARQ MU PPDU. For example, TONE_SET allocation information may be included in a specific HARQ(/HE)-SIG field of the HARQ MU PPDU.

Figure 30:
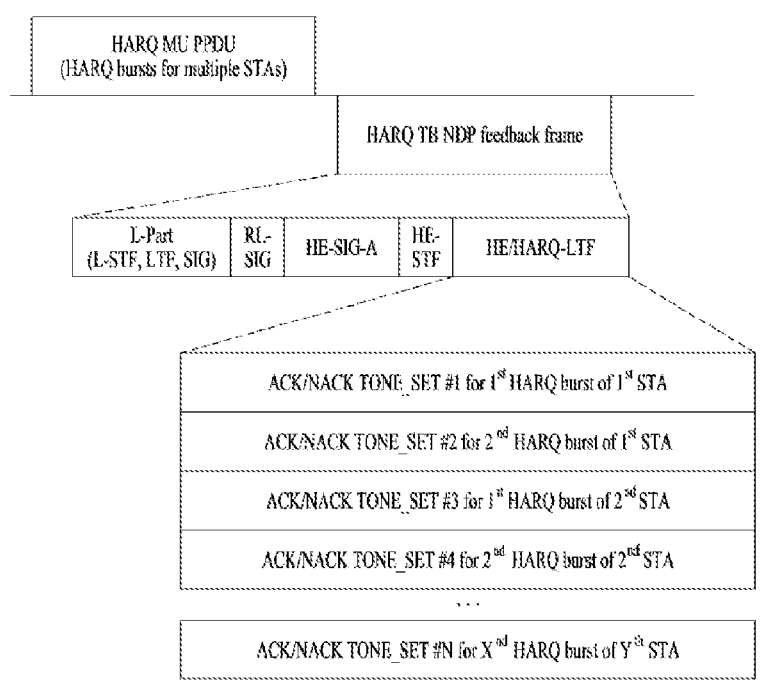
FIG. 30 illustrates another exemplary transmission of an HARQ feedback frame in the form of a null data packet (NDP) feedback frame.

FIG. 30 illustrates another example of transmitting an HARQ feedback frame in the form of an NDP feedback frame.

In FIG. 30, an AP may transmit an HARQ MU A-PPDU, and STAs receiving the HARQ MU A-PPDU may transmit HARQ feedback frames in the form of NDP feedback frames. The HARQ MU A-PPDU may include HARQ bursts (e.g., PSDUs) for multiple STAs or multiple HARQ bursts for each STA.

TONE_SET allocation information for each HARQ TB NDP feedback frame may be included in the HARQ MU A-PPDU.

An STA receiving the HARQ MU A-PPDU may transmit HARQ ACK/NACK information in a TONE_SET of an HARQ TB NDP feedback frame allocated to the STA. In the example of FIG. 30, TONE_SET #1 indicates HARQ ACK/NACK information for the first HARQ burst of a first STA, TONE_SET #2 indicates HARQ ACK/NACK information for the second HARQ burst of the first STA, and TONE_SET #3 indicates HARQ ACK/NACK information for the first HARQ burst of a second STA, and TONE_SET #4 indicates HARQ ACK/NACK information for the second HARQ burst of the second STA. TONE_SET #N indicates HARQ ACK/NACK information for an $X^{th}$ HARQ burst of a $Y^{th}$ STA.

Similarly to the HE NDP feedback frame, on the assumption that each TONE_SET includes 12 tones (e.g., 6 tones in a first subset and the other 6 tones in a second subset), a total of 18 TONE_SETs may be configured in a 20-MHz bandwidth in the HARQ TB NDP feedback frame. If one TONE_SET is used only for one stream, HARQ ACK/NACK transmission for a total of 18 HARQ bursts (PPDUs, PSDUs, or Data) may be supported.

Similarly to the afore-mentioned HARQ MU PPDU, the number of streams multiplexed by P-matrix codes in the same TONE_SET of the same RU (the number of streams for the same STA or the number of streams for different STAs) may increase in the HARQ TB NDP feedback frame for the HARQ MU A-PPDU. The different streams (different streams of the same STA or different streams of different STAs) may be distinguished in the same TONE_SET by stream indices or a starting stream number.

As mentioned above, one the assumption that 4×HE-LTF is used and each TONE_SET includes 12 tones (e.g., 6 tones in a first subset, and the other 6 tones in a second subset), a total of 18 TONE_SETs may be configured in a 20-MHz bandwidth. If one TONE_SET is shared for multiple streams, 18 or more streams may be supported (or ACK/NACK transmission for 18 or more HARQ bursts may be allowed).

As described above, on the assumption that up to 18 TONE_SETs may be configured in the 20-MHz bandwidth, in order to increase supported ACK/NACK transmission occasions for HARQ bursts, the number of streams (e.g., streams of the same STA or streams of different STAs) multiplexed in the same TONE_SET of the same RU by P-matrix codes may be increased.

Figure 31:
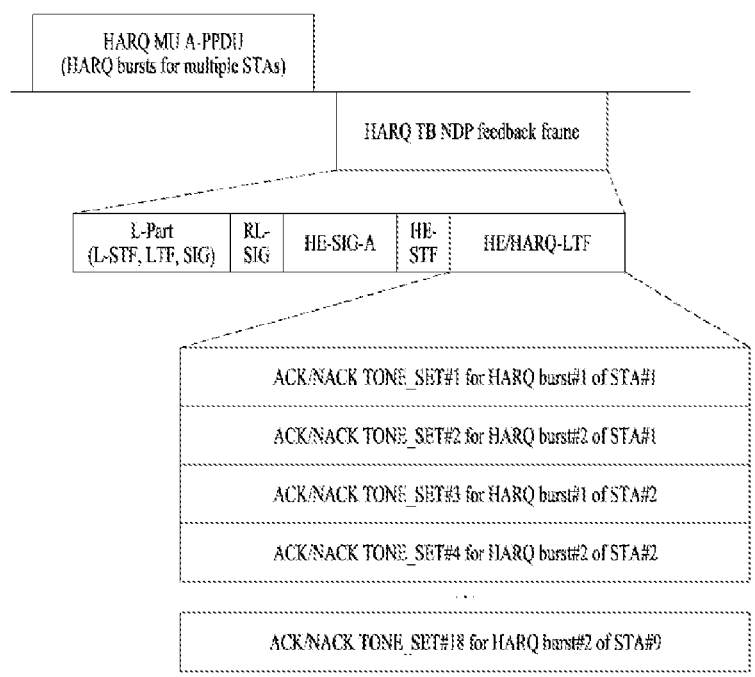
FIG. 31 illustrates another exemplary transmission of ACK/NACK information in two HE-LTF symbols.

For example, when the number of multiplexed streams is 1, ACK/NACK transmission for up to 18 HARQ bursts may be supported, and as described above, one HE-LTF symbol (e.g., 16 us in 4× HE-LTF) with 3.2 us GI) or two HE-LTF symbols (e.g., 32 us in 4× HE-LTF with 3.2 us GI) may be used (e.g., FIG. 31). It may be preferable to use two HE-LTF symbols in terms of implementation complexity.

FIG. 31 illustrates another example of transmitting ACK/NACK information in two HE-LTF symbols.

In FIG. 31, TONE_SET #1 may be used for HARQ ACK/NACK transmission for HARQ Burst #1 of STA #1, TONE_SET #2 may be used for HARQ ACK/NACK transmission for HARQ Burst #2 of STA #1, TONE_SET #3 may be used for HARQ ACK/NACK transmission for HARQ Burst #1 of STA #2, TONE_SET #4 may be used for HARQ ACK/NACK transmission for HARQ Burst #2 of STA #2, . . . , and TONE_SET #18 may be used for HARQ ACK/NACK transmission for HARQ Burst #2 of STA #9.

Figure 32:
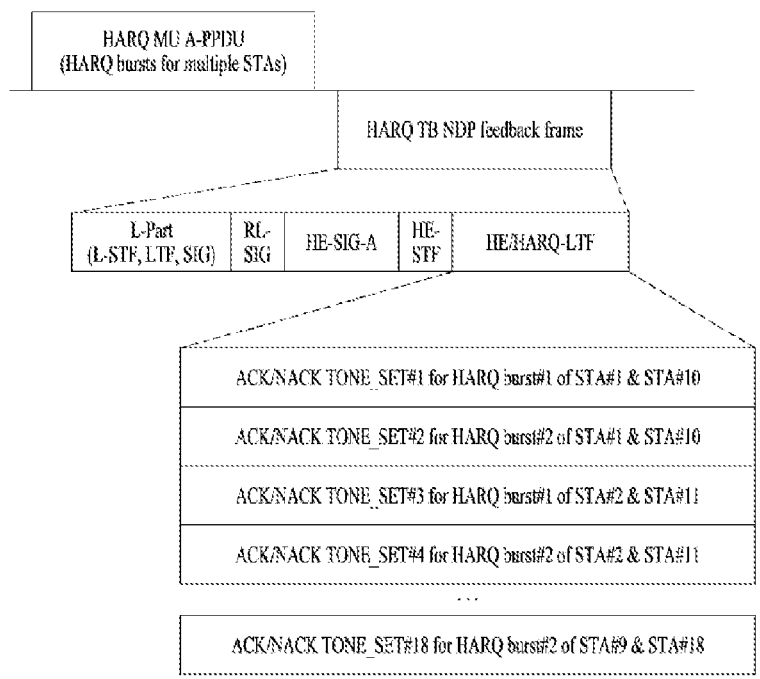
FIG. 32 illustrates another exemplary transmission of ACK/NACK information in two HE-LTF symbols.

When the number of multiplexed streams is 2, ACK/NACK transmission for up to 36 HARQ bursts may be supported, and two HE-LTF symbols (e.g., 32 us in 4× HE-LTF) below with 3.2 us GI) may be used, as illustrated in FIG. 32.

FIG. 32 illustrates another example of transmitting ACK/NACK information in two HE-LTF symbols.

In FIG. 32, TONE_SET #1 may be used for HARQ ACK/NACK transmission for HARQ Burst #1 of STA #1 and STA #10, TONE_SET #2 may be used for HARQ ACK/NACK transmission for HARQ Burst #2 of STA #1 and STA #10, TONE_SET #3 may be used for HARQ ACK/NACK transmission for HARQ Burst #1 of STA #2 and STA #11, TONE_SET #4 may be used for HARQ ACK/NACK transmission for HARQ Burst #2 of STA #2 and STA #11, . . . , and TONE_SET #18 may be used for HARQ ACK/NACK transmission for HARQ Burst #2 of STA #9 and STA #18.

The streams (or STAs or different HARQ bursts) in each TONE_SET may be distinguished by stream indices or a starting stream number.

When the same TONE_SET is simultaneously used by two or more STAs, methods of distinguishing the STAs may be needed for an HARQ feedback receiver. One of the methods is to distinguish STAs in the spatial domain. For example, when the same TONE_SET is allocated to a plurality of STAs, the number and indices of streams that each STA should use may be indicated. When the STA transmits a sequence (e.g., LTF) in the tones of a TONE_SET allocated to it, the STA applies P-matrix codes corresponding to the streams to the TONE_SET. Different P-matrix codes are used for different streams, and mutually orthogonal for the streams. Therefore, the HARQ feedback receiver (e.g., an AP) may multiply a received signal by a P-matrix to extract a signal for a stream of a corresponding STA.

In a specific example, it is assumed that HARQ-LTF may deliver two streams, and the two streams are allocated to two STAs. For transmission of the two streams, the HE-LTF may include two symbols. In this case, a 2×2 P-matrix code is used, and the 2×2 P-matrix code may be defined as Equation 3. It is assumed that STA1 uses power a and STA2 uses power b.

2×2$P$-matrix=[1,−1]—1st Raw Vector

[1,1]—2nd Raw Vector [Equation 3]

When STA1 transmits power a in HE-LTF symbols 1 and 2 by using {1, −1}, and STA2 transmits power b in HE-LTF symbols 1 and 2 by using {1, 1}, a signal actually received by the receiver (e.g., AP) is c1 in symbol 1 and c2 in symbol 2.

Therefore, since the receiver may obtain a+b=c1 and −a+b=c2, and thus b=(c1+c2)/2, a=c1−(c1+c2)/2, the receiver may extract the signals (a, b) transmitted by STA1 and STA2, and determine whether the STAs have transmitted ACK or NACK by checking the signals transmitted by the STAs.

While it is assumed in the above examples that different streams are allocated to different STAs, the same method may be applied to a case in which the same STA uses different streams, and the receiver may distinguish the different streams from each other.

Figure 33:
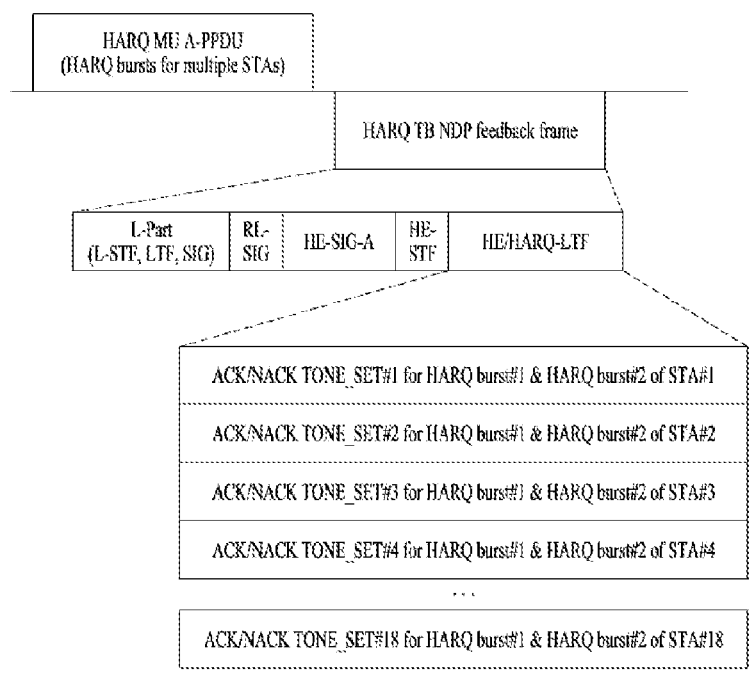
FIG. 33 illustrates an example of sharing one TONE_SET for different streams of one station (STA).

While FIG. 32 illustrates an example in which one TONE_SET is shared between streams of different STAs, FIG. 33 illustrates an example in which one TONE_SET is shared for different streams of one STA.

In FIG. 33, TONE_SET #1 is used for HARQ ACK/NACK transmission for HARQ Burst #1 and HARQ Burst #2 of STA #1, TONE_SET #2 is used for HARQ ACK/NACK transmission for HARQ Burst #1 and HARQ Burst # of STA #2, TONE_SET #3 is used for HARQ ACK/NACK transmission for HARQ Burst #1 and HARQ Burst #2 of STA #3, TONE_SET #4 is used for HARQ ACK/NACK transmission for HARQ Burst #1 and HARQ Burt #2 of STA4, . . . , and TONE_SET #18 is used for HARQ ACK/NACK transmission for HARQ Burst #1 and HARQ Burst #2 of STA #18. The streams (or STAs or different HARQ bursts) in each TONE_SET may be distinguished from each other by stream indices or a starting stream number.

Figure 34:
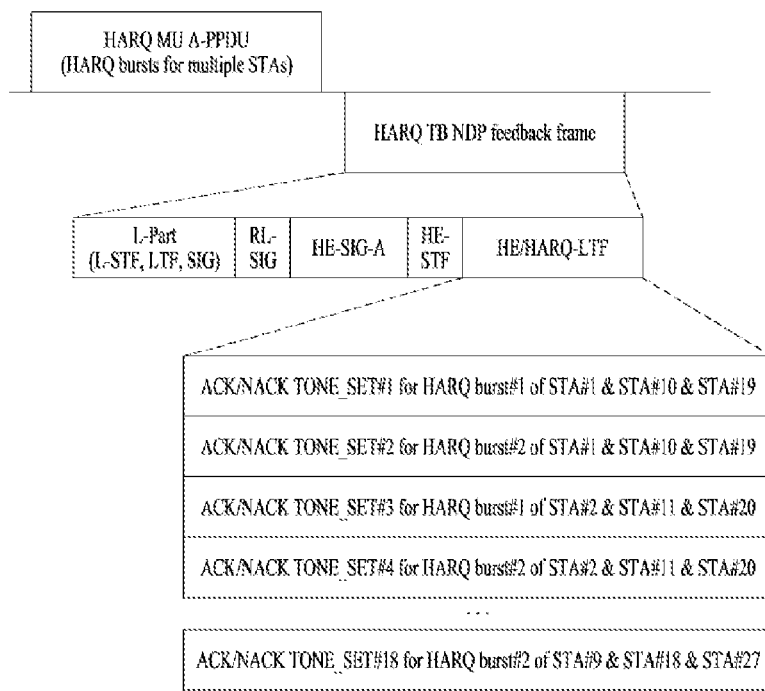
FIG. 34 illustrates another exemplary transmission of an HARQ trigger-based (TB) NDP feedback frame.

When the number of multiplexed streams is 3, ACK/NACK transmission for up to 54 HARQ bursts may be supported, and three HE-LTF symbols (e.g., 48 us in 4×HE-LTF with 3.2 us GI) or four HE-LTF symbols (e.g., 64 us in 4× HE-LTF with 3.2 us GI) may be used. It may be preferable to use 4 HE-LTF symbols in terms of implementation complexity. In the legacy Wi-Fi (11ac/ax), four HE-LTF symbols are used for three streams. FIG. 34 illustrates an example of this case.

FIG. 34 illustrates another exemplary transmission of an HARQ TB NDP feedback frame.

In FIG. 34, TONE_SET #1 is used for HARQ ACK/NACK transmission for HARQ Burst #1 of STA #1, STA #10, and STA #19, TONE_SET #2 is used for HARQ ACK/NACK transmission for HARQ Burst #2 STA #1, STA #10, and STA #19, TONE_SET #3 is used for HARQ ACK/NACK transmission for HARQ Burst #1 of STA #2, STA #11, and STA #20, TONE_SET #4 is used for HARQ ACK/NACK transmission for HARQ Burt #2 of STA #2, STA #11, and STA #20, . . . , and TONE_SET #18 is used for HARQ ACK/NACK transmission for HARQ Burst #2 of STA #9, STA #18, and STA #27.

The streams (or STAs or different HARQ bursts) in each TONE_SET may be distinguished from each other by stream indices or a starting stream number.

Figure 35:
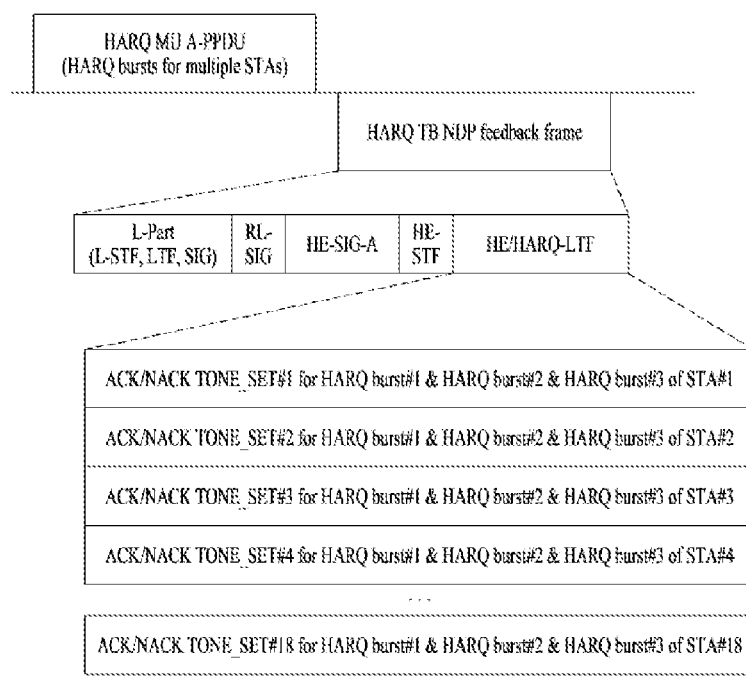
FIG. 35 illustrates another example of sharing one TONE_SET for different streams of one STA.

While FIG. 34 illustrates an example in which one TONE_SET is shared between streams of different STAs, and FIG. 35 illustrates an example in which one TONE_SET is shared for different streams of the same STA.

In FIG. 35, TONE_SET #1 is used for HARQ ACK/NACK transmission for HARQ Burst #1, HARQ Burst #2, and HARQ Burst #3 of STA #1, TONE_SET #2 is used for HARQ ACK/NACK transmission for HARQ Burst #1, HARQ Burst #2, and HARQ Burst #3 of STA #2, TONE_SET #3 is used for HARQ ACK/NACK transmission for HARQ Burst #1, HARQ Burst #2, and HARQ Burst #3 of STA #3, TONE_SET #4 is used for HARQ ACK/NACK transmission for HARQ Burst #1, HARQ Burst #2, and HARQ Burst #3 of STA4, . . . , and TONE_SET #18 is used for HARQ ACK/NACK transmission for HARQ Burst #1, HARQ Burst #2, and HARQ Burst #3 of STA #18. The streams (or STAs or different HARQ bursts) in each TONE_SET may be distinguished from each other by stream indices or a starting stream number.

Figure 36:
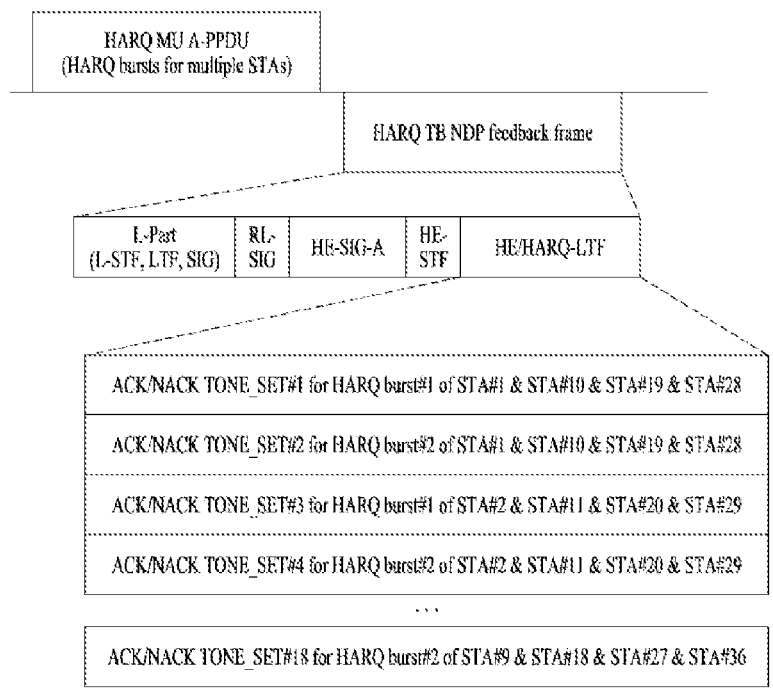
FIG. 36 illustrates another exemplary transmission of an HARQ TB NDP feedback frame.

FIG. 36 illustrates another exemplary transmission of an HARQ TB NDP feedback frame.

When the number of multiplexed streams is 4, ACK/NACK transmission for up to 72 HARQ bursts may be supported, and four HE-LTF symbols (e.g., 64 us in 4× HE-LTF with 3.2 us GI) may be used.

In FIG. 36, TONE_SET #1 is used for HARQ ACK/NACK transmission for HARQ Burst #1 of STA #1, STA #10, STA #19, and STA #28, TONE_SET #2 is used for HARQ ACK/NACK transmission for HARQ Burst #2 of STA #1, STA #10, STA #19, and STA #28, TONE_SET #3 is used for HARQ ACK/NACK transmission for HARQ Burst #1 of STA #2, STA #11, STA #20, and STA #29, TONE_SET #4 is used for HARQ ACK/NACK transmission for HARQ Burst #2 of STA #2, STA #11, STA #20, and STA #29, . . . , and TONE_SET #18 is used for HARQ ACK/NACK transmission for HARQ Burst #2 of STA #9, STA #18, STA #27, and STA #36. The streams (or STAs or different HARQ bursts) in each TONE_SET may be distinguished from each other by stream indices or a starting stream number.

Figure 37:
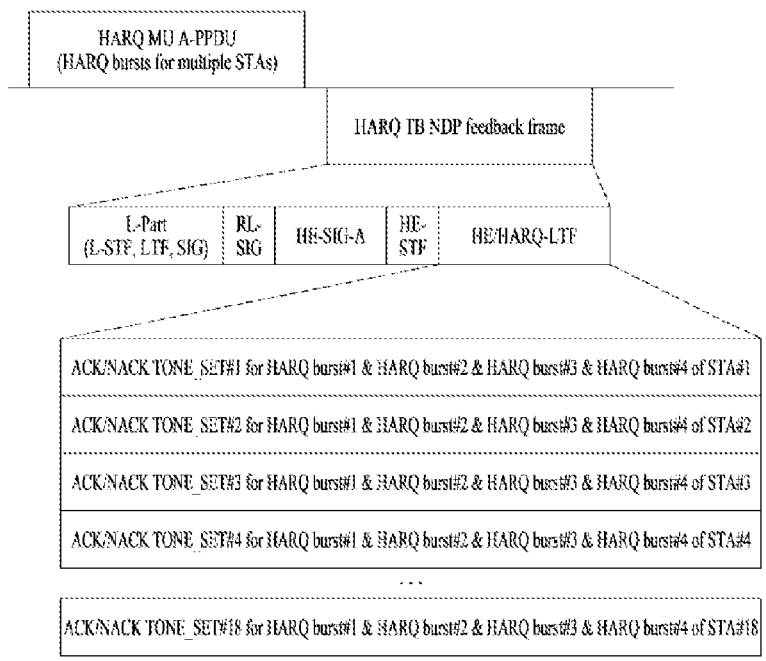
FIG. 37 illustrates another example of sharing one TONE_SET for different streams of one STA.

FIG. 36 illustrates an example in which one TONE_SET is shared for streams of different STAs, and FIG. 37 illustrates an example in which one TONE_SET is shared for different streams of one STA.

In FIG. 37, TONE_SET #1 is used for HARQ ACK/NACK transmission for HARQ Burst #1, HARQ Burst #2, HARQ Burst #3, and HARQ Burst #4 of STA #1, TONE_SET #2 is used for HARQ ACK/NACK transmission for HARQ Burst #1, HARQ Burst #2, HARQ Burst #3, and HARQ Burst #4 of STA #2, TONE_SET #3 is used for HARQ ACK/NACK transmission for HARQ Burst #1, HARQ Burst #2, HARQ Burst #3, and HARQ Burst #4 of STA #3, TONE_SET #4 is used for HARQ ACK/NACK transmission for HARQ Burst #1, HARQ Burst #2, HARQ Burst #3, and HARQ Burst #4 of STA #4, . . . , and TONE_SET #18 is used for HARQ ACK/NACK transmission for HARQ Burst #1, HARQ Burst #2, HARQ Burst #3, and HARQ Burst #4 of STA #18. The streams (or STAs or different HARQ bursts) in each TONE_SET may be distinguished from each other by stream indices or a starting stream number.

In a similar manner, even 5, 6, 7, or 8 may be supported as the number of multiplexed streams by a P-matrix in one TONE_SET. Regarding the number of HE-LTF symbols, 6

HE-LTF symbols may be used for 5 and 6 streams, and 8 HE-LTF symbols may be used for 7 and 8 streams.

In the above HARQ (TB NDP) feedback frames, HE-SIG-A or HE-STF may be replaced with HARQ-SIG-A or HARQ-STF.

Figure 38:
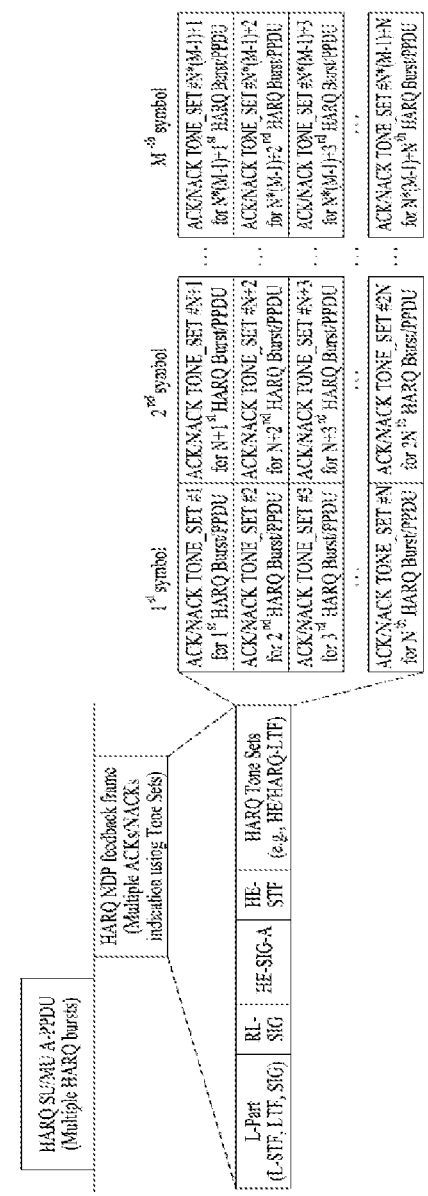
FIG. 38 is a diagram illustrating a method of increasing the number of TONE_SETs supported in an HARQ TB NDP feedback frame by extending symbols in the time domain.

While there is a method of increasing the number of multiple supported HARQ bursts in the spatial domain by using a P-Matrix, the number of TONE_SETs supported in an HARQ TB NDP feedback frame may be increased by extending symbols in the time domain. FIG. 38 illustrates an example of this method.

Referring to FIG. 38, HARQ tone sets may include HARQ ACK/NACK information for a total of 2*N HARQ data. The first symbol of the HARQ tone sets includes N HARQ tone sets for HARQ ACKs/NACKs corresponding to N HARQ data. The second symbol includes N HARQ tone sets for HARQ ACKs/NACKs corresponding to the remaining N HARQ data. The STA uses the $(N*(M-1)+1)^{th}$ tone set for HARQ ACK/NACK transmission for the $(N*(M-1)+1)^{th}$ HARQ Burst/PPDU, and the $(N*(M-1)+N)^{th}$ for HARQ ACK/NACK transmission for the $(N*(M-1)+N)^{th}$ HARQ Burst/PPDU.

If the HE TB NDP feedback structure is still adopted and two symbols are used, N is 18 and a total of 36 TONE_SETs are used to transmit ACK/NACK information for 36 HARQ data.

According to an embodiment of the present disclosure, although an HARQ NDP feedback frame may be defined through the application of the HE NDP feedback frame as described before, the present disclosure is not limited to such a frame format. For example, an HARQ NDP feedback frame may be configured with one or more of RL-SIG, HARQ(/HE)-SIG-A, and HARQ(/HE)-STF omitted.

Figure 39:
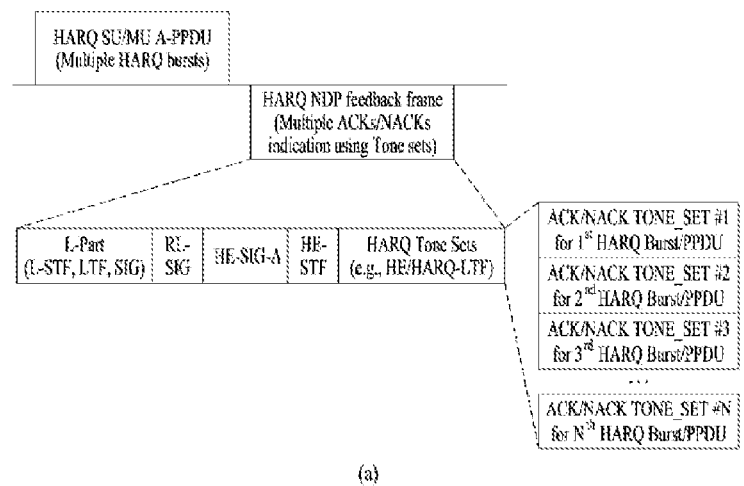
FIG. 39 illustrates another exemplary HARQ NDP feedback frame.
Figure 39:
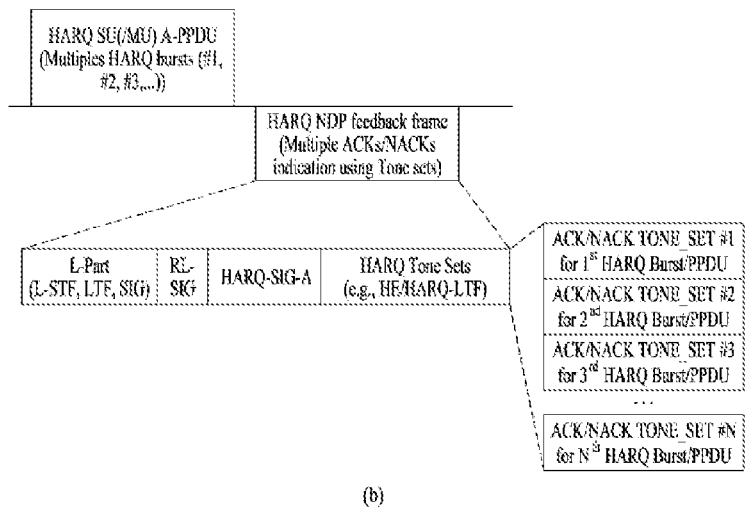

FIG. 39 illustrates another exemplary HARQ NDP feedback frame.

Specifically, FIG. 39(a) illustrates an exemplary HARQ NDP feedback frame including all of RL-SIG, HE(/HARQ)-SIG-A, and HE(/HARQ)-STF. The HARQ NDP feedback frame of FIG. 39(a) may be used for both an HARQ SU A-PPDU and an HARQ MU A-PPDU.

FIG. 39(b) illustrates an exemplary HARQ NDP feedback frame without HE(/HARQ)-STF. The HARQ NDP feedback frame of FIG. 39(b) may be used for both of an HARQ SU A-PPDU and an HARQ MU A-PPDU.

Figure 40:
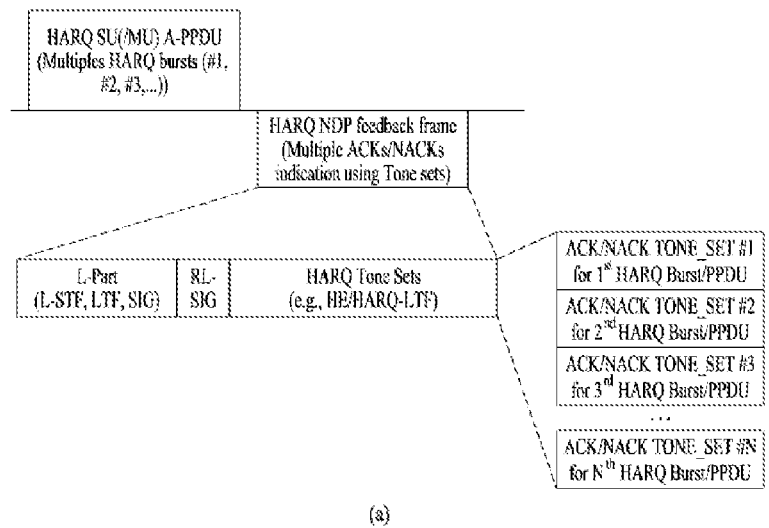
FIG. 40 illustrates another exemplary HARQ NDP feedback frame.
Figure 40:
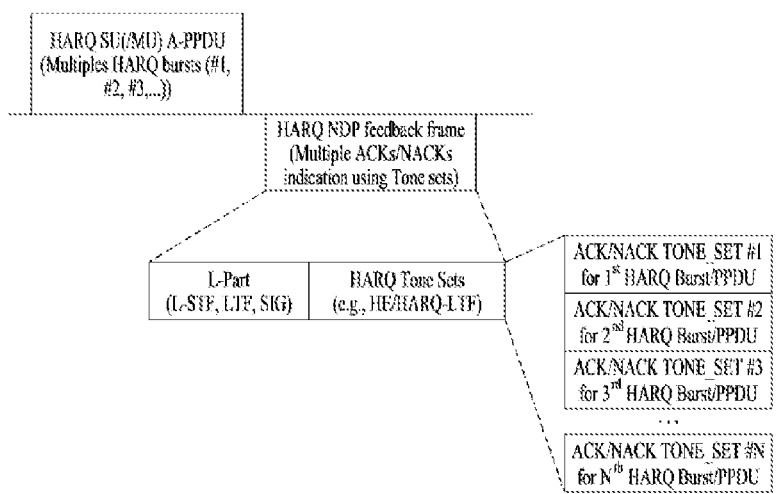

FIG. 40 illustrates other exemplary HARQ NDP feedback frames.

Specifically, FIG. 40(a) illustrates an exemplary HARQ NDP feedback frame without HARQ(/HE)-SIG-A and HARQ(/HE)-STF. The HARQ NDP feedback frame of FIG. 40(a) may be used for both of an HARQ SU A-PPDU and an HARQ MU A-PPDU.

FIG. 40(b) illustrates an exemplary HARQ NDP feedback frame without RL-SIG, HARQ(/HE)-SIG-A and HARQ(/HE)-STF. The HARQ NDP feedback frame of FIG. 40(b) may be used for both of an HARQ SU A-PPDU and an HARQ MU A-PPDU.

Figure 41:
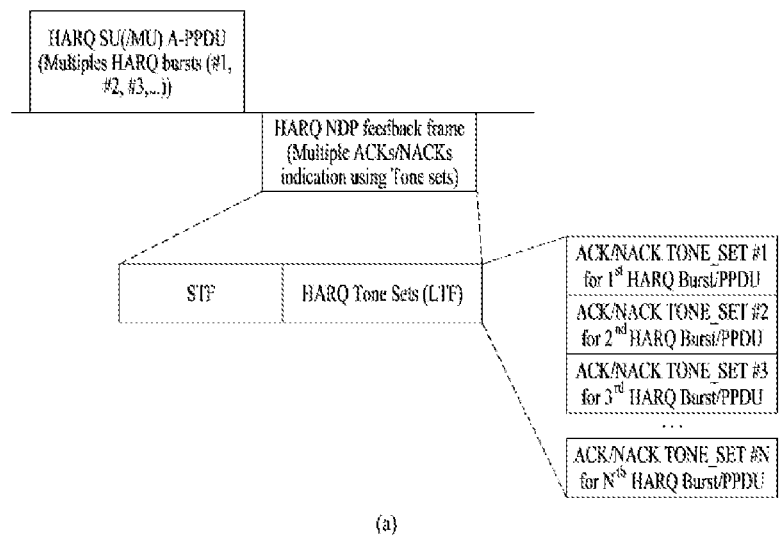
FIG. 41 illustrates another exemplary HARQ NDP feedback frame.
Figure 41:
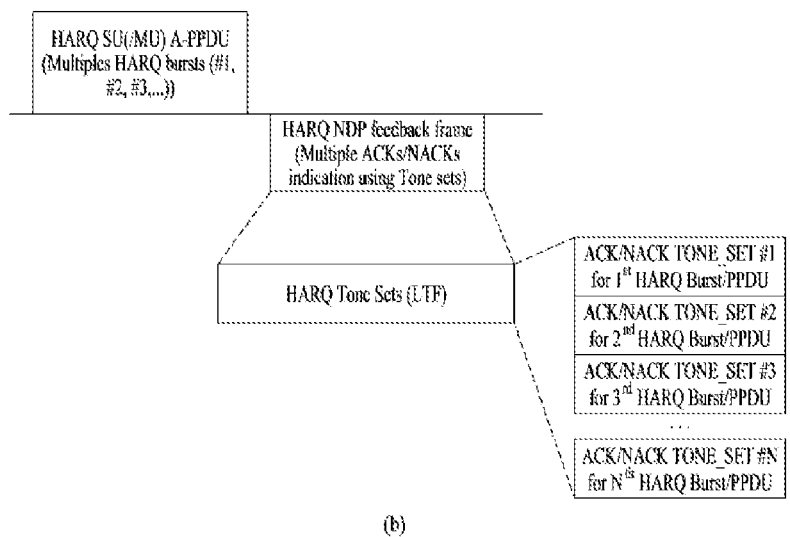

FIG. 41 illustrates other exemplary HARQ NDP feedback frames.

Referring to FIG. 41(a), an HARQ feedback frame may include an STF sequence and an LTF sequence.

The STA may use a sequence selected from among a plurality of sequences defined in the legacy 802.11 system as an STF/LTF sequence, or may modify an existing sequence and use the modified sequence as an STF/LTF sequence. Table 5 lists exemplary STF+LTF structures. The STA may select one of the STF/LTFs.

TABLE 5

| STF | | LTF | |
|---|---|---|---|
| Type | Note | Type | Note |
| L-STF (8 us) | The same structure as L-STF defined in legacy 11a, n, ac, and ax. Transmitted for 8 us. STF occurs twice repeatedly. 0.8 us occurs 10 times repeatedly. | L-LTF (8 us) | The same structure as L-LTF defined in legacy 11a, n, ac, and ax. One is selected. Transmitted for 8 us. 4 us 1x L-LTF is transmitted twice repeatedly. |
| L-STF (4 us) | Only 4 us 1 symbol is used in L-STF structure defined in legacy 11a, n, ac, and ax. That is, STF is transmitted only once. 0.8 us occurs 5 times repeatedly. | L-LTF (4 us) | Only 4 us 1 symbol is transmitted in L-LTF structure defined in legacy 11a, n, ac, and ax. That is, 4 us 1x L-LTF is transmitted only once. |
| HT/VHT-STF (4 us) | The same structure as L-STF defined in legacy 11n and ac. 0.8 us occurs 5 times repeatedly. | HT/VHT-LTF (4 us) | Only 4 us 1 symbol is used in HT/VHT-LTF structure defined in legacy 11n and ac. 4 us 1x HT/VHT-LTF is transmitted only once. |
| HT/VHT-STF (8 us) | HT/VHT-LTF structure defined in legacy 11n and ac is repeated. A duration of 8 us. STF is transmitted twice repeatedly. 0.8 us occurs 10 times repeatedly. | HT/VHT-LTF (8 us) | HT/VHT-LTF structure defined in legacy 11n and ac is repeated once more. A duration of 8 us. 4 us 1x HT/VHT-LTF is transmitted twice repeatedly. |
| HE-STF (4 us) | Only 4 us 1 symbol is used in HE-STF structure defined in legacy 11ax. 0.8 us occurs 5 times repeatedly. | HE-LTF (4 us) | Transmitted for 4 us in HE-LTF structure defined in legacy 11a, n, ac, and ax. 1x HE-LTF is transmitted once. |
| HE-STF (8 us) | The same structure as HE-STF defined in legacy 11a, n, ac, and ax. One is selected. A duration of 8 us. 1.6 us occurs 5 times repeatedly. | HE-LTF (8 us) | The same structure as HE-LTF defined in legacy 11a, n, ac, and ax. One is selected. A duration of 8 us. 2x HE-LTF is transmitted once. |

TABLE 5-continued

| STF | | LTF | |
|---|---|---|---|
| Type | Note | Type | Note |
| | | HE-LTF (16 us) | A duration of 16 us is used in HE-LTF structure defined in legacy 11a, n, ac, and ax. 4x HE-LTF is transmitted once. |
| | | HE-LTF (32 us) | Transmitted for 32 us in HE-LTF structure defined in legacy 11a, n, ac, and ax. 4x HE-LTF is transmitted twice repeatedly. |

STF/LTF of Table 5 may be used for all of the STF/LTFs described herein.

Although the methods based on various STFs and LTFs have been described above, since the number of tones used in an STF sequence is ¼ of LTF, a larger number of tone sets may be configured when the LTF is used. Therefore, it may be more preferable to use LTF. Particularly, when a 4x HE-LTF structure is used for HE-LTF, the number of tone sets may be maximized (e.g., an SCS may be minimized) and thus it may be preferable to use the 4x HE-LTF structure or a similar structure.

Referring to FIG. 41(b), an HARQ feedback frame may be configured and transmitted only with an LTF sequence. An STA may transmit HARQ ACK/NACK information in a tone set allocated from an HARQ tone set by using one of the afore-described LTFs and one of the afore-described TONE_SET structures.

HARQ tone set (e.g., HARQ-LTF, HE-LTF, . . . ) information may be delivered in a structure other than the above-described feedback frame structures.

Further, while an HARQ tone set may be configured through HE-LTF/HARQ-LTF, the HARQ tone set may be configured with a different type of sequence such as HE-STF or HARQ-STF.

Figure 42:
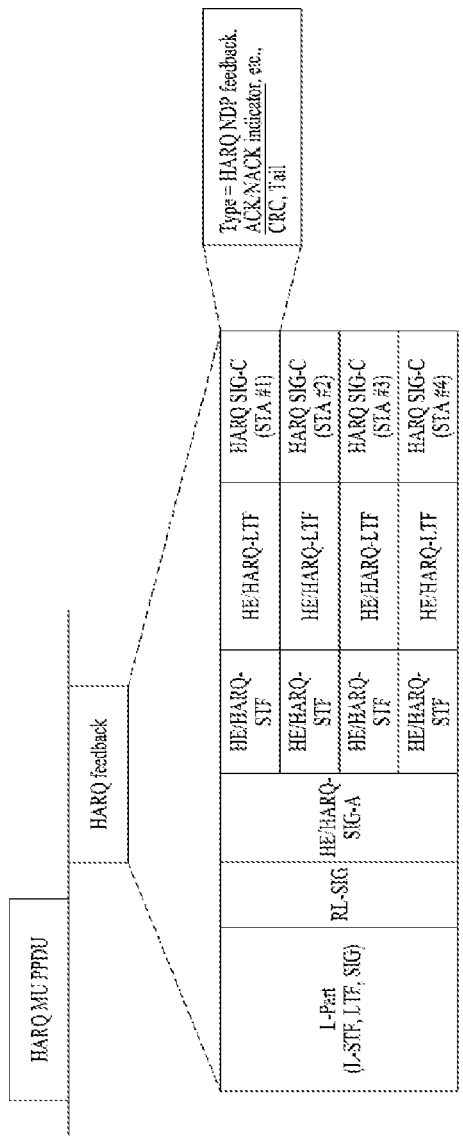
FIG. 42 illustrates an exemplary transmission of an HARQ feedback for an HARQ MU PPDU in HARQ-SIG.

FIG. 42 illustrates an example in which an HARQ feedback for an HARQ MU PPDU is transmitted in HARQ-SIG.

Referring to FIG. 42, an HARQ MU PPDU includes HARQ bursts for multiple STAs (1 burst (or PSDU or PPDU) per STA). After the STAs receive the HARQ bursts included in the HARQ MU PPDU, the STAs transmit HARQ ACK/NACK information in HARQ feedback frames. In this embodiment, each STA includes HARQ ACK/NACK information in HARQ-SIG-C, and transmits an HARQ feedback frame in resources allocated to it. Resource allocation information for each STA is included in the HARQ MU PPDU, or each STA may determine a resource allocation position for transmission of its HARQ feedback in an implicit method.

Figure 43:
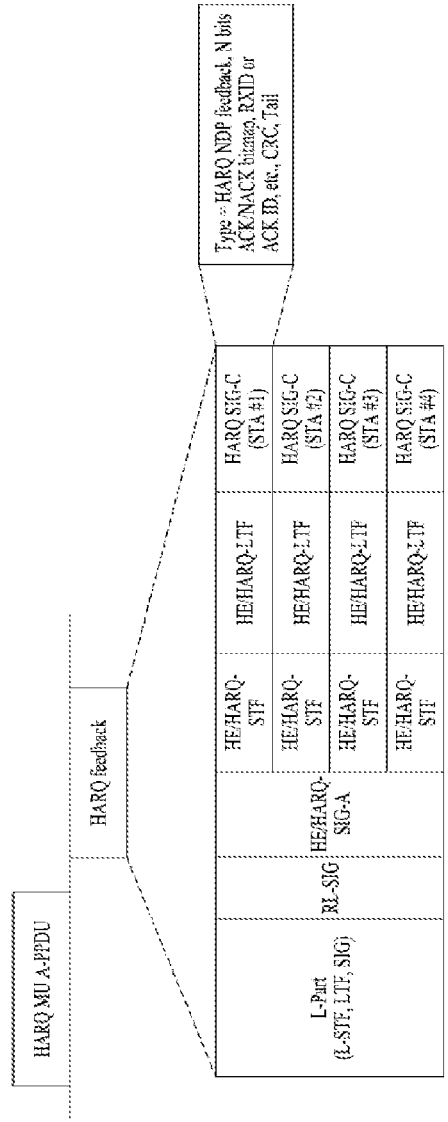
FIG. 43 illustrates an exemplary transmission of an HARQ feedback for an HARQ MU A-PPDU in HARQ-SIG.

FIG. 43 illustrates an example of transmitting an HARQ feedback for an HARQ MU A-PPDU in HARQ-SIG.

Since each STA is capable of transmitting ACK/NACK information for multiple HARQ bursts, an N-bit ACK/NACK bitmap may be included in HARQ-SIG-C, and the bitmap size may be fixed in the system.

The above-mentioned HARQ MU PPDU or HARQ MU A-PPDU may be related to DL (e.g., DL HARQ MU PPDU or DL HARQ MU A-PPDU), and an HARQ feedback for the PPDU or A-PPDU may be for UL (e.g., UL HARQ feedback frame).

Figure 44:
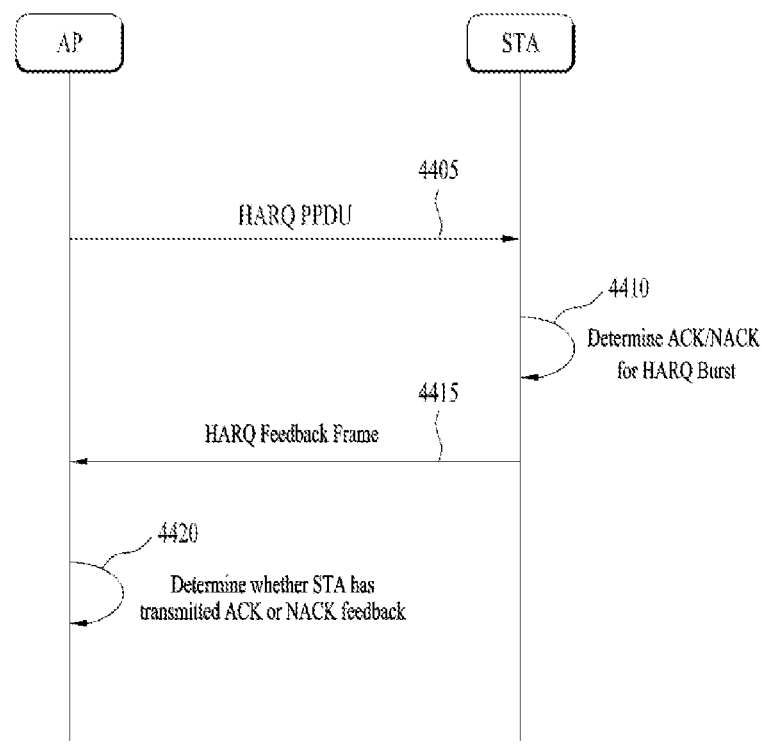
FIG. 44 is a flowchart illustrating a method of transmitting and receiving an HARQ feedback frame.

FIG. 44 is a diagram illustrating a signal flow for a method of transmitting an HARQ feedback frame according to an embodiment of the present disclosure. This method is an exemplary implementation of the afore-described embodiments, and thus the present disclosure is not limited to FIG. 44. A redundant description to the forgoing description is avoided herein.

For the convenience of description, it is assumed that a transmitting STA is an AP STA and a receiving STA is a non-AP STA, which should not be construed as limiting. On the contrary, the receiving STA may be an AP STA and the transmitting STA is a non-AP STA, or both of the transmitting and receiving STAs are non-AP STAs.

A non-AP STA may be referred to shortly as an STA.

Referring to FIG. 44, an AP transmits an HARQ PPDU including a plurality of HARQ bursts (4405). An STA receives the HARQ PPDU.

The STA determines ACK/NACK for at least one HARQ burst allocated to the STA among the plurality of HARQ bursts (4410).

The STA transmits an HARQ feedback frame including a specific sequence based on a result of the ACK/NACK determination (4415). A band in which the HARQ feedback frame is transmitted may include a plurality of tone sets. Each of the plurality of tones sets may be divided into a first subset of tones and a second subset of tones. The STA may transmit the specific sequence in a specific tone set related to the at least one HARQ burst. When the ACK/NACK determination result is ACK, the STA may transmit the specific sequence only in a first subset of tones of a specific tone set. When the ACK/NACK determination result is NACK, the STA may transmit the specific sequence only in a second subset of tones of the specific tone set.

The AP receives the HARQ feedback frame from the STA (4420).

The AP determines the ACK/NACK feedback of the STA for the at least one HARQ burst allocated to the STA among the plurality of HARQ bursts based on the HARQ feedback frame (4425). For example, the AP determines whether the STA has fed back ACK or NACK. The AP receives the specific sequence transmitted by the STA in the specific tone set related to the at least one HARQ burst. When receiving the specific sequence only in the first subset of tones of the specific tone set, the AP may determine that the ACK/NACK feedback of the STA is ACK. When receiving the specific sequence only in the second subset of tones of the specific tone set, the AP may determine that the ACK/NACK feedback of the STA is NACK.

For example, each of the plurality of HARQ bursts may be related to a plurality of tone sets. The STA may transmit the specific sequence in an $N^{th}$ tone set among the plurality of tones sets, for an ACK/NACK determination result for an $N^{th}$ HARQ burst set among the plurality of HARQ bursts.

In another example, one tone set may be related to every set of k HARQ bursts among the plurality of HARQ bursts. ACK/NACK determination results for k HARQ bursts may be multiplexed in the time domain or spatial domain and mapped to one tone set. The ACK/NACK determination results for the k HARQ bursts may be multiplexed in at least k symbols in the time domain. Alternatively, the ACK/NACK determination results for the k HARQ bursts may be multiplexed by a P-matrix code. The k HARQ bursts may be allocated to the same STA or k STAs.

For example, the specific sequence may be an LTF sequence of the HARQ feedback frame.

For example, the HARQ feedback frame may be an NDP frame.

For example, one tone set may include a total of 12 tones, and each subset may include 6 tones.

Figure 45:
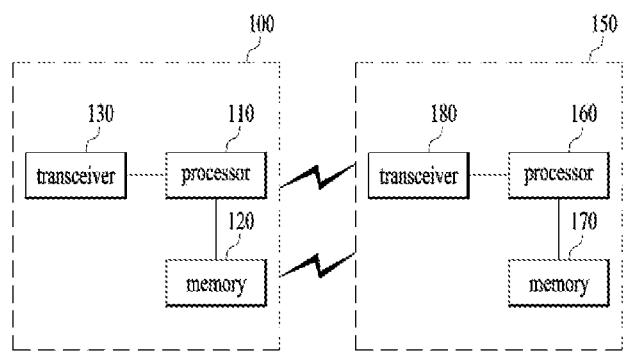
FIG. 45 is a block diagram illustrating apparatuses according to an embodiment of the present disclosure.

FIG. 45 is an explanatory diagram of a device for implementing the above-described method.

A wireless apparatus 800 of FIG. 45 may correspond to the above-described specific STA and a wireless apparatus 850 of FIG. 45 may correspond to the above-described AP.

The STA 800 may include a processor 810, a memory 820, and a transceiver 830, and the AP 850 may include a processor 860, a memory 870, and a transceiver 880. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the exemplary embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein.

INDUSTRIAL APPLICABILITY

The present disclosure may be applied to various wireless communication systems including an IEEE 802.11 system.

The invention claimed is:

1. A method of transmitting a hybrid automatic repeat request (HARQ) feedback frame by a station (STA) in a wireless local area network (WLAN) system supporting an HARQ process, the method comprising:
   receiving an HARQ physical layer protocol data unit (PPDU) including a plurality of HARQ bursts;
   determining an acknowledgment/negative acknowledgment (ACK/NACK) for at least one HARQ burst allocated to the STA among the plurality of HARQ bursts; and
   transmitting an HARQ feedback frame including a specific sequence based on a result of the ACK/NACK determination,
   wherein a band in which the HARQ feedback frame is transmitted includes a plurality of tone sets, each tone set being divided into a first subset of tones and a second subset of tones, and
   wherein the STA transmits the specific sequence in a specific tone set related to the at least one HARQ burst, wherein when the result of the ACK/NACK determination is the ACK, the STA transmits the specific sequence only in the first subset of tones of the specific tone set, and when the result of the ACK/NACK determination is the NACK, the STA transmits the specific sequence only in the second subset of tones of the specific tone set.

2. The method according to claim 1, wherein each of the plurality of HARQ bursts is related to one of the plurality of tone sets, and
   wherein for a result of ACK/NACK determination for an $N^{th}$ HARQ burst among the plurality of HARQ bursts, the STA transmits the specific sequence in an $N^{th}$ tone set among the plurality of tone sets.

3. The method according to claim 1, wherein one tone set is related to every set of k HARQ bursts among the plurality of HARQ bursts, and
   wherein results of the ACK/NACK determination for k HARQ bursts are multiplexed in a time domain or a spatial domain and mapped to one tone set.

4. The method according to claim 3, wherein the results of the ACK/NACK determination for the k HARQ bursts are multiplexed in at least k symbols in the time domain, or by a P-matrix code in the spatial domain.

5. The method according to claim 3, wherein the k HARQ bursts are allocated to the same STA or k STAs.

6. The method according to claim 1, wherein the specific sequence is a long training field (LTF) sequence of the HARQ feedback frame.

7. The method according to claim 1, wherein the HARQ feedback frame is a null data packet (NDP) frame, and
   wherein one tone set includes a total of 12 tones, and each subset includes 6 tones.

8. A method of receiving a hybrid automatic repeat request (HARQ) feedback frame by an access point (AP) in a wireless local area network (WLAN) system supporting an HARQ process, the method comprising:
   transmitting an HARQ physical layer protocol data unit (PPDU) including a plurality of HARQ bursts;
   receiving an HARQ feedback frame from a station (STA); and
   determining an acknowledgment/negative acknowledgment (ACK/NACK) feedback of the STA for at least one HARQ burst allocated to the STA among the plurality of HARQ bursts, based on the HARQ feedback frame,
   wherein a band in which the HARQ feedback frame is transmitted includes a plurality of tone sets, each tone set being divided into a first subset of tones and a second subset of tones, and
   wherein the AP receives a specific sequence in a specific tone set related to the at least one HARQ burst, wherein when the AP receives the specific sequence only in the first subset of tones of the specific tone set, the AP determines that the ACK/NACK feedback of the STA is an ACK, and when the AP receives the specific sequence only in the second subset of tones of the specific tone set, the AP determines that the ACK/NACK feedback of the STA is a NACK.

9. The method according to claim 8, wherein each of the plurality of HARQ bursts is related to one of the plurality of tone sets, and wherein the AP determines an ACK/NACK feedback for an $N^{th}$ HARQ burst among the plurality of HARQ bursts by using an $N^{th}$ tone set among the plurality of tone sets.

10. The method according to claim 8, wherein one tone set is related to every set of k HARQ bursts among the plurality of HARQ bursts, and wherein ACKs/NACKs for k HARQ bursts are multiplexed in a time domain or a spatial domain and mapped to one tone set.

11. The method according to claim 10, wherein the ACKs/NACKs for the k HARQ bursts are multiplexed in at least k symbols in the time domain, or by a P-matrix code in the spatial domain.

12. The method according to claim 10, wherein the k HARQ bursts are allocated to the same STA or k STAs.

13. The method according to claim 8, wherein the specific sequence is a long training field (LTF) sequence of the HARQ feedback frame.

14. The method according to claim 8, wherein the HARQ feedback frame is a null data packet (NDP) frame, and wherein one tone set includes a total of 12 tones, and each subset includes 6 tones.

15. A station (STA) for transmitting a hybrid automatic repeat request (HARQ) feedback frame in a wireless local area network (WLAN) system supporting an HARQ process, the STA comprising:

a receiver;

a transmitter; and a processor configured to receive an HARQ physical layer protocol data unit (PPDU) including a plurality of HARQ bursts through the receiver, determine an acknowledgment/negative acknowledgment (ACK/NACK) for at least one HARQ burst allocated to the STA among the plurality of HARQ bursts, and transmit an HARQ feedback frame including a specific sequence based on a result of the ACK/NACK determination through the transmitter, wherein a band in which the HARQ feedback frame is transmitted includes a plurality of tone sets, each tone set being divided into a first subset of tones and a second subset of tones, and wherein the processor is configured to transmit the specific sequence in a specific tone set related to the at least one HARQ burst, wherein when the result of the ACK/NACK determination is the ACK, the processor is configured to transmit the specific sequence only in the first subset of tones of the specific tone set, and when the result of the ACK/NACK determination is the NACK, the processor is configured to transmit the specific sequence only in the second subset of tones of the specific tone set.

* * * * *